US012473516B2

(12) United States Patent
Ahmed et al.

(10) Patent No.: US 12,473,516 B2
(45) Date of Patent: Nov. 18, 2025

(54) DUST EXTRACTION CONDUCTS AND PROCESSES

(71) Applicant: The Procter & Gamble Company, Cincinnati, OH (US)

(72) Inventors: Ahmed Ibrahim Sayed Ahmed, Cairo (EG); Fatema Amen Abdelhalem Mohamed Beder, Cairo (EG); Helen Amy Lang, Northumberland (GB); Yara Tarek Mohamed Mahdally, Cairo (EG); Hossam Hassan Tantawy, Morpeth (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/757,939

(22) Filed: Jun. 28, 2024

(65) Prior Publication Data
US 2025/0011692 A1 Jan. 9, 2025

(30) Foreign Application Priority Data

Jun. 30, 2023 (EP) .................................... 23182750

(51) Int. Cl.
C11D 17/04 (2006.01)
B65B 1/28 (2006.01)
(Continued)

(52) U.S. Cl.
CPC .............. C11D 17/044 (2013.01); B65B 1/28 (2013.01); B65B 9/087 (2013.01); B65B 65/06 (2013.01); C11D 3/10 (2013.01); C11D 3/128 (2013.01)

(58) Field of Classification Search
CPC .......... B65B 1/20; B65B 9/087; B65B 65/06; C11D 17/044; C11D 3/10; C11D 3/128
See application file for complete search history.

(56) References Cited

U.S. PATENT DOCUMENTS 11,214,394 B2 * 1/2022 Palumbo .......... B29C 66/91445
2005/0257501 A1 * 11/2005 Natterer ................ B65B 31/028
53/329.3
(Continued)

FOREIGN PATENT DOCUMENTS

EP 3219627 A1 9/2017
JP 2002059904 A 2/2002
JP 6956733 B2 10/2021

OTHER PUBLICATIONS

EPO Search Report and Opinion for 23182750.2 dated Jan. 17, 2024, 6 pages.
(Continued)

Primary Examiner — Joshua G Kotis
Assistant Examiner — Scott A Howell
(74) Attorney, Agent, or Firm — Gary J. Foose

(57) ABSTRACT

An example system comprises a water-soluble unit dose article comprising a water-soluble fibrous non-woven sheet and a granular laundry detergent. The water-soluble fibrous non-woven sheet is shaped to form a partially sealed internal compartment and has an air permeability comprised between 5 m³/m²/min and 200 m³/m²/min. The granular laundry detergent is comprised within said internal compartment and comprises a plurality of particles, wherein the plurality of particles comprises zeolite particles. The system comprises sealing jaws, wherein at least one of the sealing jaws is a heated sealing jaw, wherein a bottom seal of the internal compartment is sandwiched between the jaws. The jaws comprise a non-stick coating in contact with the bottom seal and a first dust extraction conduct to direct a gas flow away from an area surrounding a top section of the sealing jaws or away from a bottom section of the internal compartment.

14 Claims, 9 Drawing Sheets

(51) Int. Cl.
    *B65B 9/087*     (2012.01)
    *B65B 65/06*     (2006.01)
    *C11D 3/10*     (2006.01)
    *C11D 3/12*     (2006.01)

(56) References Cited

U.S. PATENT DOCUMENTS

| | | | | |
|---|---|---|---|---|
| 2018/0162574 | A1* | 6/2018 | Deantoni | B65B 9/2049 |
| 2018/0296398 | A1* | 10/2018 | Fritz | A61F 13/531 |
| 2019/0185187 | A1* | 6/2019 | Gandhi | G01G 3/15 |
| 2021/0122511 | A1* | 4/2021 | Trombetta | B29C 65/02 |
| 2022/0333045 | A1* | 10/2022 | Bullivant | B65B 9/20 |

OTHER PUBLICATIONS

PCT Search report and Written opinion for PCT/US2024/033964 dated Oct. 7, 2024, 13 pages.

\* cited by examiner

DUST EXTRACTION CONDUCTS AND PROCESSES

BACKGROUND OF THE INVENTION

A laundry detergent may conveniently be stored outside of a washing machine and delivered in an aqueous solution in the form of a water-soluble unit dose articles. An example water-soluble unit dose article used in washing machines contains dissolvable granular laundry detergent enveloped in a water-soluble fibrous non-woven sheet.

DETAILED DESCRIPTION OF THE INVENTION

Figure 1:
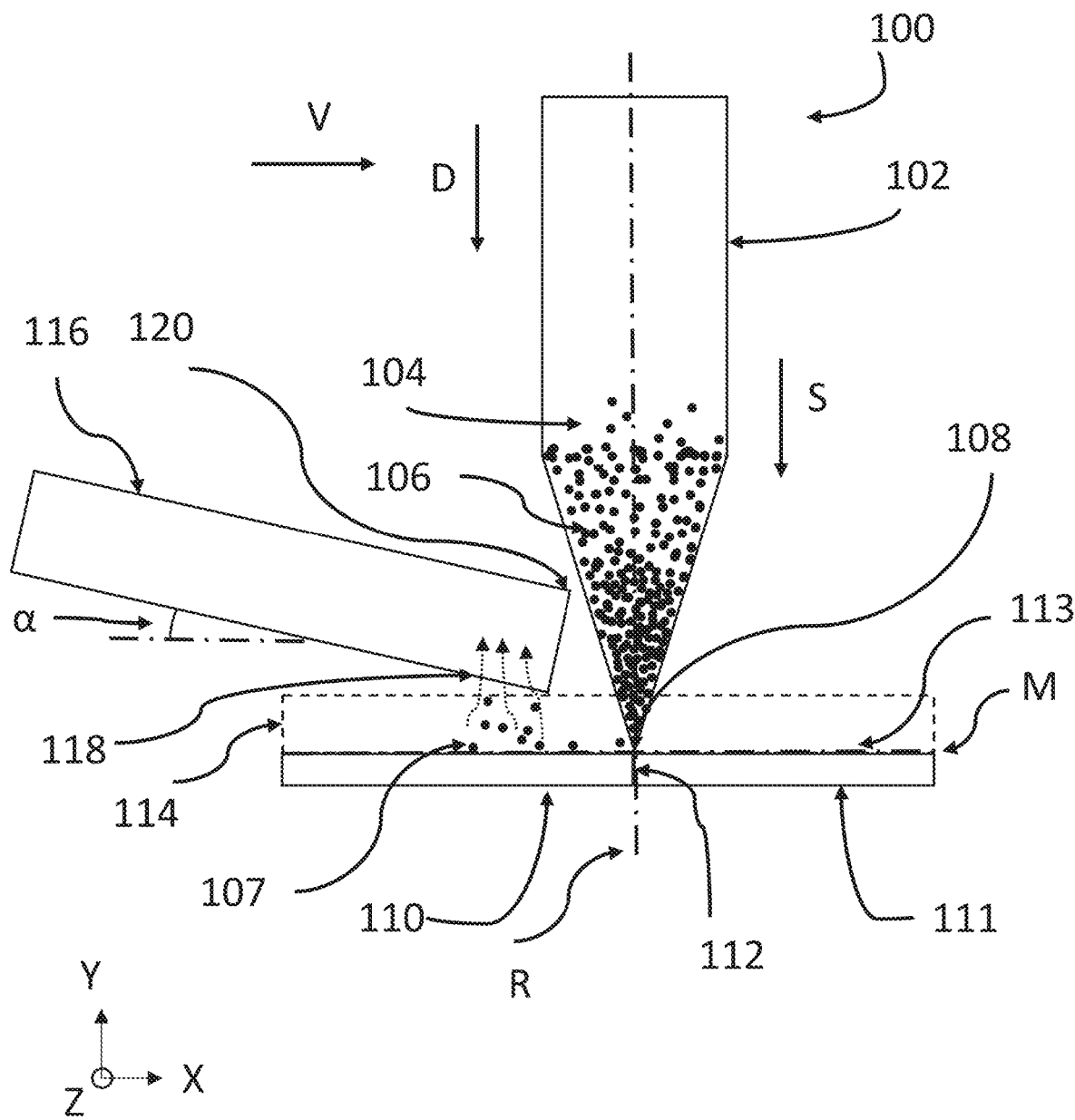
FIG. 1-6 schematically illustrate cross-sections of various example systems.

As will be explained in more details below, a dust extraction conduct as per this disclosure is such that the dust extraction conduct extracts undesired leakage of granular detergent from a water-soluble unit dose article.

The water-soluble unit dose article is such that granular laundry detergent is comprised within an internal compartment formed by a water-soluble fibrous non-woven sheet. The water-soluble fibrous non-woven sheet allows transportation of the granular laundry detergent prior to its use in a washing machine. When in use in a washing machine, the water-soluble fibrous non-woven sheet and the granular laundry detergent dissolve. It was found that with an excessively low air permeability of the water-soluble fibrous non-woven sheet, the detergent or the sheet can have difficulties dissolving or do not dissolve in use during a wash. Additionally, it was found that with an excessively high air permeability of the water-soluble fibrous non-woven sheet, the granular laundry detergent can leak out of the water-soluble fibrous non-woven sheet in a high proportion. It was derived from these conditions that, with a suitable air permeability of the water-soluble fibrous non-woven sheet, few particles of granular laundry detergent can leak out of the water-soluble unit dose article during storage, while permitting satisfactory dissolution during a wash.

It was also found that zeolite particles, while participating to obtain satisfactory laundry washing, have an abrasive effect during the manufacture of a water-soluble unit dose article. The presence of such particles can damage sealing jaws used to sandwich a water-soluble fibrous non-woven sheet to form a seal of an internal compartment of a water-soluble unit dose article. Such zeolite abrasive particles indeed tend to scrape away the surface of the sealing jaws. Such deterioration was particularly observed when one of the sealing jaws is a heated sealing jaw comprising a non-stick coating. Indeed, in order to reduce a possibility that the non-woven sheet sticks to the heated sealing jaw and results in a poorer or weaker seal, a non-stick coating of such heated sealing jaw is brought in contact with such seal of the water-soluble unit dose article and the abrasive zeolite particles escaping from the internal compartment through the water-soluble fibrous non-woven sheet damage the non-stick coating. These damages can result in a failure of the water-soluble unit dose article manufacturing process. In particular, sealing of the water-soluble unit dose article can fail, or the non-woven sheet can stick to the heated sealing jaw. Accordingly, the manufacturing process has to be stopped more often to clean the sealing jaws from abrasive particles or to change the non-stick coating.

The disclosure relates to a dust extraction conduct which directs a gas flow away from an area surrounding a top section of the sealing jaws. In particular, the dust extraction conduct can extract abrasive particles. The dust extraction conduct works in combination with an air permeability of the water-soluble fibrous non-woven sheet comprised between 5 $m^3/m^2/min$ and 200 $m^3/m^2/min$. It was found that an air permeability of the water-soluble fibrous non-woven sheet in such a range permitted satisfactory dissolution of the water-soluble unit dose article during a wash, avoided excessive leakage of detergent through the water-soluble fibrous non-woven sheet during storage of the water-soluble unit dose article prior to a wash, while permitting extraction of zeolite particles by the dust extraction conduct. Such air permeability range in particular permits generating an air flow while permeating the water-soluble fibrous non-woven sheet during the manufacturing of the water-soluble unit dose article and avoiding extracting a significant proportion of granular laundry detergent through the water-soluble fibrous non-woven sheet. Such dust extraction conduct thereby participates in increasing the life expectancy of the sealing jaws and decreases the probability of failure during the manufacturing process.

The present disclosure relates to a system comprising a water-soluble unit dose article, sealing jaws and a dust extraction system. The water-soluble unit dose article comprises a water-soluble fibrous non-woven sheet and a granular laundry detergent composition.

Water-Soluble Unit Dose Article

The water-soluble unit dose article comprises a water-soluble fibrous non-woven sheet and a granular laundry detergent composition. The fibrous non-woven sheet and the granular laundry detergent composition are described in more detail below.

The water-soluble fibrous non-woven sheet is shaped to form a partially sealed internal compartment, wherein the granular laundry detergent composition is comprised within said internal compartment.

The unit dose article may comprise a first fibrous non-woven sheet and a second water-soluble fibrous non-woven sheet sealed to one another such to define the internal compartment.

The water-soluble unit dose article is constructed such that the granular detergent composition does not leak out of the compartment during storage. However, upon addition of the water-soluble unit dose article to water, the water-soluble non-woven fibrous sheet dissolves and releases the contents of the internal compartment into the wash liquor. The terms "first", "second", "third" and so on merely distinguish different elements and, unless otherwise stated, are not to be specifically associated with a particular order or particular numbering of elements in the disclosure.

The compartment should be understood as meaning a closed internal space within the unit dose article, which holds the granular detergent composition. In some examples, a first water-soluble fibrous non-woven sheet may be shaped to comprise an open compartment into which the detergent composition is added. A second water-soluble fibrous non-woven sheet may then be laid over the first sheet in such an orientation as to close the opening of the compartment. The first and second sheets may then be sealed together along a seal region. In other examples, a same single sheet may be formed into a sleeve (i.e. in a generally tubular shape), the sleeve being transversally sealed (i.e. sealed along directions at an angle, for example perpendicularly, to an axis of the tubular shape) to form the compartment. In other words, a single water-soluble fibrous non-woven sheet may be shaped into an open container. The granular laundry detergent composition may then be filled into the open container and then the open container sealed to close it and form the internal compartment.

The unit dose article may comprise more than one compartment, even at least two compartments, or even at least three compartments. The compartments may be positioned in a side-by-side orientation, i.e. one orientated next to the other. Alternatively, one compartment may be completely enclosed within another compartment. Wherein the unit dose article comprises at least two compartments, one of the compartments may be smaller than the other compartment. Each compartment may comprise the same or different compositions.

FIG. 1-5 disclose various different example systems according to the present disclosure. An example system comprises a water-soluble unit dose article 100, sealing jaws 110, 111 and a first dust extraction conduct 116. The illustrated water-soluble unit dose article 100 has a generally rectangular shape body when seen along a direction V, direction V being perpendicular to a direction of the bottom seal and perpendicular to an axis of a sleeve comprising the water-soluble fibrous non-woven sheet, with a generally triangular cross-section at a bottom tip, the cross-section being across a plane normal, or orthogonal, to the direction of the bottom seal, however the body and the bottom tip may have any suitable shape including, square, triangular, circular, oval, hexagonal or a mixture thereof. The water-soluble unit dose article 100 shown comprises a water-soluble fibrous non-woven sheet 102. The water-soluble fibrous non-woven sheet 102 is shaped to create at least one internal compartment 104 containing the granular laundry detergent composition 106. The water-soluble unit dose article 100 shown is symmetric along a plane R which will be defined in more detail below. While not represented, in some examples the water-soluble unit dose article can present an asymmetric shape.

A detailed description of example dust extraction conducts is provided in the following description.

Water-Soluble Fibrous Non-Woven Sheet

The water-soluble unit dose article comprises a water-soluble fibrous non-woven sheet. The water-soluble fibrous non-woven sheet comprises a plurality of fibres. Preferably, the fibres are inter-entangled fibres in the form of a fibrous structure.

The water-soluble fibrous non-woven sheet may be homogeneous or may be layered. If layered, the water-soluble fibrous non-woven sheet may comprise at least two and/or at least three and/or at least four and/or at least five layers.

Preferably, the water-soluble fibrous non-woven sheet has a basis weight of between 15 gsm and 60 gsm, preferably between 20 gsm and 55 gsm, more preferably between 25 gsm and 50 gsm, most preferably between 25 gsm and 45 gsm. Those skilled in the art will be aware of methods to measure the basis weight.

Basis weight of a water-soluble fibrous non-woven sheet may be measured on stacks of twelve usable units using a top loading analytical balance with a resolution of ±0.001 g. The balance is protected from air drafts and other disturbances using a draft shield. A precision cutting die, measuring 8.9 cm±0.009 cm by 8.9 cm±0.009 cm is used to prepare all samples.

With a precision cutting die, cut the samples into squares. Combine the cut squares to form a stack where the stack is twelve samples thick. Measure the mass of the sample stack and record the result to the nearest 0.001 g.

The Basis Weight is calculated in $g/m^2$ (gsm) as follows:

Basis Weight=(Mass of stack)/[(Area of 1 square in stack)×(Number of squares in stack)]

By 'fibre' we herein mean an elongated element having a length exceeding its average diameter, preferably, a length to average diameter ratio of at least about 10.

Preferably, each fibre may have a length of greater than or equal to 5.08 cm, greater than or equal to 7.62 cm, greater than or equal to 10.16, greater than or equal to 15.24 cm or a mixture thereof.

Alternatively, each fibre may have length of less than 5.08 cm, less than 3.81 cm, less than 2.54 cm, or a mixture thereof.

Each fibre may have a width of less than 100 μm, less than 75 μm, less than 50 μm, less than 25 μm, less than 10 μm, less than 5 μm, less than 1 μm or a mixture thereof. Those skilled in the art will be aware of standard methods and techniques to measure the width. Preferred methods include Scanning Electron Microscope (SEM) or an Optical Microscope together with image analysis software.

The water-soluble fibrous non-woven sheet may comprise a plurality of identical or substantially identical, from a compositional perspective, fibres. Alternatively, the water-soluble fibrous non-woven sheet may comprise two or more different fibres according to the present invention. Non-limiting examples of differences in the fibres may be physical differences such as differences in diameter, length, texture, shape, rigidness, elasticity, and the like; chemical differences such as one or more of crosslinking level, solubility, melting point, glass transition temperature Tg and active agent.

Preferably, the fibres are present between 80% and 95%, preferably between 85% and 93%, more preferably between 87% and 90% by weight of the water-soluble fibrous non-woven sheet. The water-soluble fibrous non-woven sheet may exhibit different regions, such as different regions of basis weight, density, and/or caliper. The water-soluble fibrous non-woven sheet may comprise texture on one or more of its surfaces. A surface of the water-soluble fibrous non-woven sheet may comprise a pattern, such as a non-random, repeating pattern.

The water-soluble fibrous non-woven sheet may have a thickness between 0.01 mm and 100 mm, preferably between 0.05 mm and 50 mm, more preferably between 0.1 mm and 20 mm, even more preferably between 0.1 mm and 10 mm, even more preferably between 0.1 mm and 5 mm, even more preferably between 0.1 mm and 2 mm, even more preferably between 0.1 mm and 0.5 mm, most preferably between 0.1 mm and 0.3 mm. Those skilled in the art will be aware of standard methods to measure the thickness.

The fibres comprise polyvinyl alcohol polymer. Preferably, the fibres comprise between 50% and 98%, preferably between 65% and 97%, more preferably between 80% and 96%, even more preferably between 88% and 96% by weight of the fibre of polyvinyl alcohol.

The polyvinyl alcohol polymer may have a weight average molecular weight of between 50 kDa and 150 kDa, preferably between 75 kDa and 140 kDa, more preferably between 100 kDa and 130 kDa. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Those skilled in the art will be aware of other known techniques to determine the weight average molecular weight (MW).

Preferably, the polyvinyl alcohol polymer is a polyvinyl alcohol homopolymer. Preferably, the polyvinyl alcohol homopolymer has an average percentage degree of hydrolysis of from 75% to 100%, preferably of from 80% to 95%, most preferably of from 85% to 90%. Preferably, the polyvinyl alcohol homopolymer has an average viscosity of from 1 to 30 mPas, preferably from 5 to 25 mPas, most preferably from 10 to 20 mPas, wherein the viscosity is measured as a 4% aqueous solution in demineralized water at 20° C.

The fibres preferably comprise between 0.1% and 15% by weight of the fibres of a gel-breaker, wherein the gel-breaker is selected from polyols, sugar alcohols, amines, amides, carbohydrates, multivalent cations, or a mixture thereof, preferably polyols, sugar alcohols or a mixture thereof. Preferably, the fibres comprise between 1% and 12%, preferably between 2% and 10% by weight of the fibres of the gel-breaker.

Without wishing to be bound by theory, polyols are synthetic materials, whilst sugar alcohols are natural materials. Sugar alcohols may comprise ribose, xylose, fructose of a mixture thereof.

Preferably, the gel-breaker is selected from glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof, preferably selected from polyethylene glycol, glycerol, sorbitol, dipropylene glycol, and mixtures thereof.

Preferably, the fibres comprise between 0.1% and 15%, preferably between 1% and 12%, more preferably between 2% and 10% by weight of the fibres of a gel-breaker selected from glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof, preferably, the fibres comprise between 0.1% and 15%, preferably between 1% and 12%, more preferably between 2% and 10% by weight of the fibres of a gel-breaker selected from polyethylene glycol, glycerol, sorbitol, dipropylene glycol, and mixtures thereof.

Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from glycerol, polyethylene glycol, 1,2-propanediol, dipropylene glycol, 2-methyl-1,3-propanediol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, and mixtures thereof. Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from polyethylene glycol, glycerol, sorbitol, dipropylene glycol, and mixtures thereof.

Preferably, the polyethylene glycol has a weight average molecular weight of between 100 and 800, preferably between 200 and 750, more preferably between 400 and 700, even more preferably between 500 and 650. "Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Those skilled in the art will be aware of other known techniques to determine the weight average molecular weight (MW).

The fibrous non-woven sheet may comprise a second plurality of particles. Without wishing to be bound by theory, the fibrous non-woven sheet comprises gaps or space between the fibres. When present, the second plurality of particles are present, they preferably reside within the gaps/spaces between the fibres. Preferably, the second plurality of particles are present between 0.25% and 10%, preferably between 0.5% and 5%, more preferably between 1% and 3% by weight of the water-soluble fibrous non-woven sheet. Those skilled in the art will be aware of methods to determine the weight percentage of the second plurality of particles. A preferred method involves the following steps; both sides of the fibrous non-woven sheet are carefully separated from a detergent filled unit dose article. Each side is separately weighed. Initial weight (ladened with particle) is recorded. The particle laden fabric is placed on a sieve and a dry air compressed line is blown through the fibrous non-woven sheet to remove all lodged particles. The weight of the fibrous nonwoven is remeasured to obtain the difference. The weight difference is recorded as ((initial weight−final weight)/initial weight)×100 (recorded as weight percentage).

Preferably, the second plurality of particles within the non-woven comprises zeolite, inorganic salts, surfactant granules or a mixture thereof. Preferably, the inorganic salts comprise sodium carbonate, sodium chloride, sodium sulphate or a mixture thereof. Preferably, the surfactant granules may comprise spray dried surfactant granules, agglomerated surfactant granules or a mixture thereof.

Preferably the second plurality of particles within the non-woven have an average particle size distribution of between 1 micron and 150 microns, preferably between 5 microns and 125 microns, more preferably between 10 microns and 100 microns.

Preferably, the fibres comprise less than 5%, more preferably less than 3%, even more preferably less than 2% by weight of the fibres of water.

Preferably, the fibres do not comprise any surfactant. Without wishing to be bound by theory, surfactants are present in the granular laundry detergent composition, therefore any surfactant present within the fibres themselves do not contribute to the cleaning performance of the unit dose article.

The fibres may be made by any suitable process. The fibres may be spun from a filament-forming composition using techniques known to those in the art. Suitable spinning process operations may include meltblowing, spunbonding, electro-spinning, rotary spinning or mixtures thereof.

Without wishing to be bound by theory, non-woven fibrous sheets exhibit a different dissolution profile to a casted sheet.

Below is an exemplary test method for measuring dissolution of the fibrous non-woven sheet. The following equipment can be used in the exemplary dissolution method;

2000 mL glass beaker (approximately 7.5 inch tall by 5.5 inch in diameter)

Magnetic Stirrer Plate (Labline, Melrose Park, IL, Model No. 1250 or equivalent)

Magnetic Stirring Rod (2 inch long by ⅜ inch in diameter, Teflon coated)

Thermometer (1 to 100° C.+/−1° C.)

1.25 inch paper binder clip

Alligator clamp (about one inch long)

Depth adjuster rod and holder with base

Timer (accurate to at least 0.1 second)

Deionized water (equilibrated at 23° C.±1° C.)

Cutting Die—Stainless Steel cutting die with dimensions 3.8 cm×3.2 cm

Polaroid 35 mm Slide Mount (commercially available from Polaroid Corporation or equivalent) 35 mm Slide Mount Holder (or equivalent)

Equilibrate samples of fibrous non-woven sheet in constant temperature and humidity environment of at 23° C.±1° C. and 50%±2% relative humidity for at least 24 hours prior to testing. The dissolution test is conducted under this temperature and relative humidity condition as well.

Measure the basis weight of the sample materials using known techniques.

Cut three dissolution test specimens from a fibrous non-woven sheet sample to be tested using cutting die (3.8 cm×3.2 cm), so it fits within the 35 mm slide mount which has an open area dimensions 24×36 mm.

Lock each specimen in a separate 35 mm slide mount.

The 2000 mL glass beaker is filled with 1600±5 mL deionized water and placed on top of a magnetic stirrer plate. A magnetic stirring rod is placed at the bottom of the beaker. The stirring speed is adjusted so that a steady vortex develops at the center of the beaker with the vortex bottom at the 1200 mL mark.

A trial run may be necessary to ensure the depth adjuster rod is set up properly. Secure the 35 mm slide mount in the alligator clamp of the 35 mm slide mount holder such that the long end of the slide mount is parallel to the water surface. The alligator clamp should be positioned in the middle of the long end of the slide mount. The alligator clamp is solidarized to the end of a depth adjuster rod. The depth adjuster rod is set up in a way, so that when the paper binder clip is lowered into the water, the entire fibrous non-woven sheet specimen is completely submerged in the water at the center of the beaker, the top of fibrous non-woven sheet specimen is at the bottom of the vortex, and the bottom of the slide mount/slide mount holder is not in direct contact with the stirring bar. The depth adjuster rod and alligator clamp should be set so that the position of the apertured film wall material specimen's surface is perpendicular to the flow of the water.

In one motion, drop the secured slide and clamp into the water and start the timer. The fibrous non-woven sheet specimen is dropped so that the specimen is centered in the beaker. When all of the visible fibrous non-woven sheet specimen is released from the slide mount, raise the slide out of the water while continuing the monitor the solution for undissolved specimen fragments. Dissolution occurs when all specimen fragments are no longer visible. Record this as the dissolution time.

Three replicates of each specimen are run and the average dissolution times are reported to within +/−0.1 seconds. Average dissolution time is in units of seconds.

The average dissolution times are normalized for basis weight by dividing each by the specimen basis weight as determined by known basis weight methods. Basis weight normalized average dissolution times are in units of seconds/gsm of sample (s/(g/m2)).

A non-limiting example of a suitable process for making the fibres comprises the steps of:
  a. providing a filament-forming composition, such as from a tank; and
  b. spinning the filament-forming composition, such as via a spinning die, into one or more fibres; and
  c. collecting the fibres onto a collection device, such as a patterned belt.

The filament-forming composition may be transported via suitable piping, with or without a pump, between the tank and the spinning die. The spinning die may comprise a plurality of fibre-forming holes that include a melt capillary encircled by a concentric attenuation fluid hole through which a fluid, such as air, passes to facilitate attenuation of the filament-forming composition into a fibre as it exits the fibre-forming hole.

The filament-forming composition may be spun into one or more fibres by any suitable spinning process, such as meltblowing, spunbonding, electro-spinning, and/or rotary spinning. The filament-forming composition may be spun into a plurality of fibres by meltblowing. For example, the filament-forming composition may be pumped from a tank to a meltblown spinnerette. Upon exiting one or more of the fibre-forming holes in the spinnerette, the filament-forming composition is attenuated with air to create one or more fibres. The fibres may then be dried to remove any remaining solvent used for spinning, such as the water.

The fibres may be collected on a belt, such as a patterned belt to form a fibrous non-woven sheet comprising the fibres.

Preferably, fibrous nonwoven sheets are made by bonding or interlocking fibers by mechanical, thermal, chemical, or solvent means. When fibrous nonwoven sheets are made from staple fibers, their production involves the formation of a uniform web by a wet-laid process or carding, followed by bonding the nonwovens either thermally or by other means such as needle punching, hydroentangling, etc. Spun-laid fibrous nonwovens are made in one continuous process where fibers are spun and then directly dispersed into a web by deflectors or air streams. Meltblown fibrous nonwoven is a one-step process in which high-velocity air blows a molten thermoplastic resin from an extruder die tip on to a conveyor or take-up screen to form a fine fibrous and self-bonded web.

Sealing Jaws

FIG. 1-5 further disclose example sealing jaws 110 and 111. Sealing jaws should be understood as elongated mechanical elements such as sealing bars, for example made out of metal, in some examples made out of aluminum, which may be approximated to each other to sandwich a material between such jaws to seal such material. In order to form the seal, at least one of the sealing jaws is a heated sealing jaw. A heated sealing jaw may in some examples comprise a heat source, such as one or more resistors, or may be in contact with a heat source. In some examples, a single heated sealing jaw is provided, such single heating jaw transmitting heat to the material sandwiched or caught between the jaws. In some examples, the sealing jaws comprise a pair of heated sealing jaws facing each other, thereby increasing and homogenizing the transmission of heat compared to using a single heating jaw coupled to a jaw which would not be heated.

In some examples, a heated sealing jaw is heated by hot wire impulse technology, whereby a wire such as, for example, a nickel-chromium wire, is caused to heat rapidly by an electrical current. Other technologies may be used to heat sealing jaws. In some examples such wire may be encapsulated in a non-stick coating such as, for example, Polytetrafluoroethylene (PTFE) or a polyimide such as Poly(4,4'-oxydiphenylene-pyromellitimide). In some examples, a non-stick coating, for example a PTFE tape, is placed over the hot wire or hot seal band, such that the non-stick coating is located between the hot wire or hot seal band and the non-woven sheet in order to reduce a possibility that such non-woven sheet may stick to the heat source and result in a poorer or weaker seal.

In some examples, the non-stick coating comprises a polymeric material.

In some examples, the non-stick coating comprises a non-polymeric material such as ceramic. Ceramics may have a longer useful life expectancy than non-polymeric material.

In some examples, sealing jaws according to this disclosure may be inner sealing jaws sandwiched between outer holding jaws, for example unheated outer holding jaws, whereby first outer holding jaws, inner sealing jaws and second outer holding jaws follow each other in this order in a direction of movement of the non-woven sheet, whereby the outer holding jaws may hold the non-woven sheet in place as the seal is being formed.

In some examples, the jaws comprise a silicon layer, for example a silicon layer having a hardness comprised between 25 and 35 Shores A or a tensile strength of between 550 and 770 MPa. A high shore value or high tensile strength provides high local sealing pressure which can for example help with a precise definition or with a cutting of the seal. A high shore value may however lead to fast deterioration of a non-stick coating. In some examples, the silicon layer is placed underneath (i.e. further away from the seal compared to) a wire of a hot wire impulse component. In some examples, the silicon layer is along a full length of the sealing jaw or seal bar. In some examples, the silicon layer has a width substantially equal to a width of the sealing jaw.

In some examples, a non-stick strip such as PTFE tape, for example commercially available as Teflon tape, is placed between a silicon layer acting as underlayment and a wire of a hot wire impulse component in order to reduce friction and allow the wire to move freely during thermal expansion or contraction.

In some examples, a non-stick or PTFE strip is also placed underneath (i.e. further away from the seal compared to) the silicon layer and on top of a main body of the jaw (for example an aluminum main body) to act as an insulation layer to avoid heat transferring to the silicon and shortening silicon lifetime.

As illustrated in the example systems of FIG. 1-5, sealing jaws 110 and 111 are such that a bottom seal 108 of the sealed internal compartment 104 is sandwiched between the jaws 110, 111, wherein the sealing jaws extend along a longitudinal direction (direction Z). Such sandwiching forms the bottom seal 108 from the water-soluble fibrous non-woven sheet 102.

As illustrated in the example systems of FIG. 1, a first of said jaws, jaw 110, comprises a flat portion 112 along a longitudinal direction (direction Z) of the bottom seal 108, the flat portion having a flat portion width along a transverse direction (direction Y, corresponding to the direction D of displacement of the water-soluble fibrous non-woven sheet) perpendicular to the longitudinal direction (direction Z) of the seal and perpendicular to the longitudinal direction of the sealing jaws. In other words, the flat portion width shown should be understood as being a flat portion width along a direction D of displacement of the water-soluble fibrous non-woven sheet. As illustrated in the example systems of FIG. 1-5, the flat portion 112 of jaw 110 extends toward the opposite jaw 111.

In some examples wherein the jaws comprise a flat portion, a precise dimensioning of the first jaw in relationship with the thickness of the non-woven sheet allows a relatively strong resulting seal by pinching of the non-woven sheets by the flat portion, while limiting a width of the seal along a direction perpendicular to the longitudinal direction of the seal, thereby leading to an improved dilution of the seal in the context of the laundry cycle.

Figure 3A:
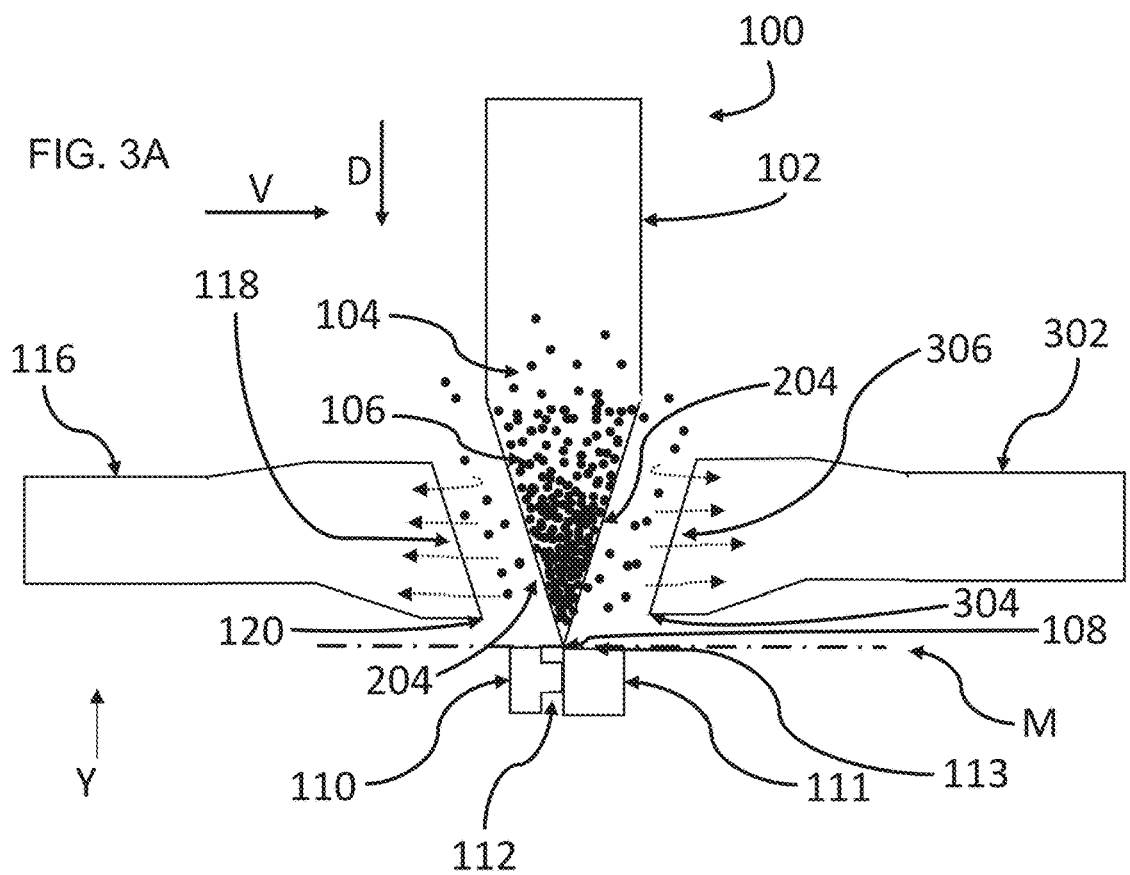

In some examples, as illustrated in FIG. 3A, the flat portion 112 of jaw 110 projects towards the opposite jaw 111.

The sealing jaws should be understood as not necessarily comprising a flat portion. In some other examples, the sealing jaws comprise an uneven portion (a protrusion or protruding portion) and a base. As illustrated in the example system of FIG. 2, a second of said jaws, jaw 111, comprises a protruding portion 202 along the longitudinal direction (direction Z) of the seal, the protruding portion 202 having a base 206, the protruding portion extending towards the opposite jaw 110. As illustrated in the example system of FIG. 2, the protruding portion 202 has an arcuate outer surface. Such a base should be understood as a surface at a junction between the protruding portion and a main body of the jaw from which the protruding portion extends. The surface of the base is substantially parallel to a plane parallel to directions Y and Z. The protruding portion, or protrusion, should be understood as a protrusion from a main body of the jaw and towards the bottom seal of the water-soluble fibrous non-woven sheet sandwiched between the sealing jaws.

As illustrated in the example systems of FIG. 1-6, the sealing jaws 110, 111 define a top section 113 comprised in a plane M, plane M being parallel to both the longitudinal direction (Z direction) of the seal and to the direction X. In other words, in the example systems of FIG. 1-5, plane M is perpendicular to the direction of displacement D (or direction Y).

In some examples, the jaws 110, 111 have different widths along Y, depth along X and longitudinal lengths along Z (direction X being perpendicular to both directions Y and Z). In some examples, the first 10 of said jaws is a heated jaw. In other examples, both jaws 110 and 111 are heated. In some examples, first jaw 110 is not heated as such while jaw 111 is heated.

Figure 6:
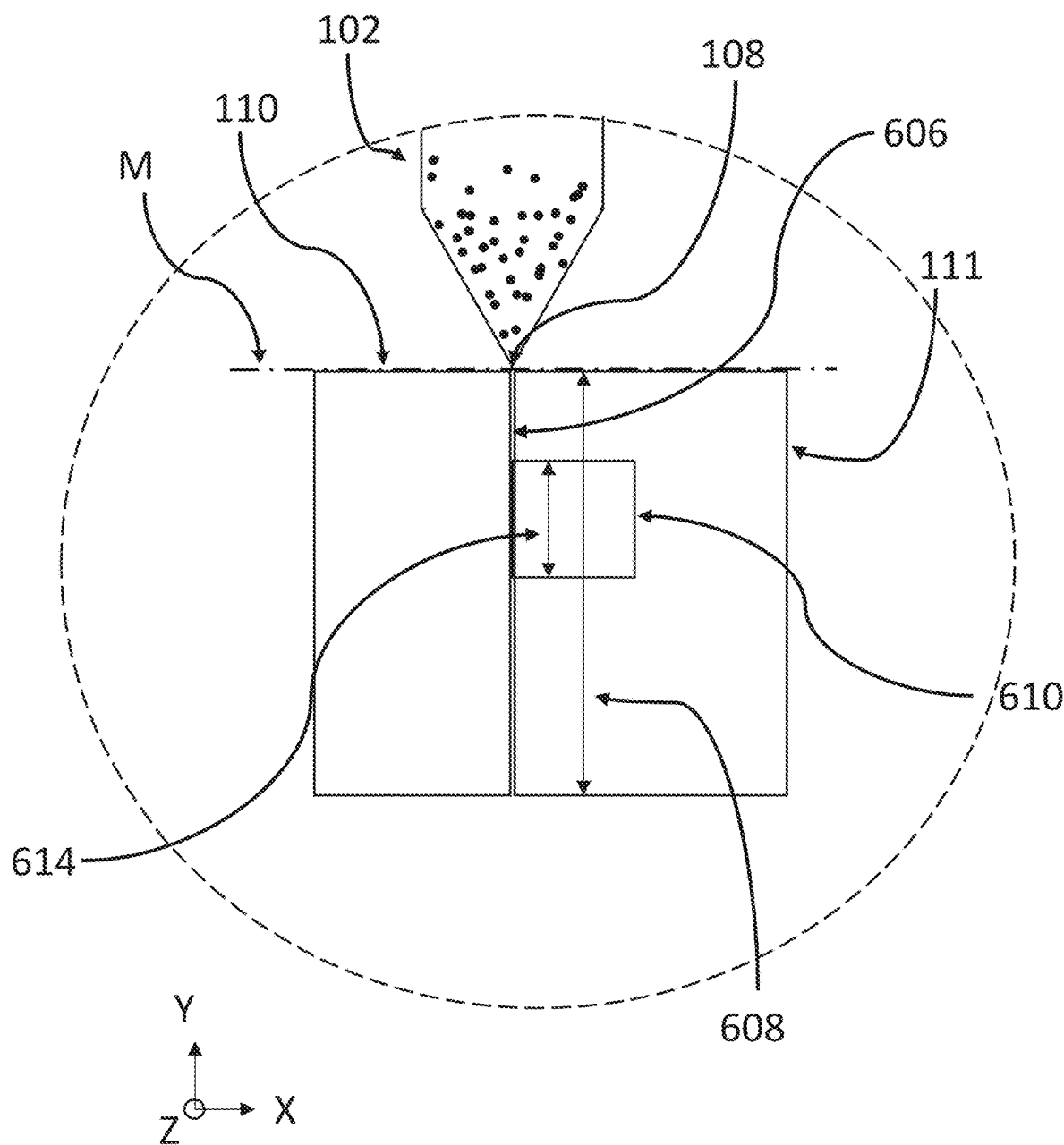

FIG. 6 focuses on an example seal area. FIG. 6 illustrates example seal jaws 110, 111, jaw 111 comprising a flat portion 606 along the longitudinal direction (Z direction) of the seal 108, the flat portion 606 having a width 608 along direction Y. The flat portion illustrated in FIG. 6 should be understood as being similar to the flat portion described previously. FIG. 6 also illustrates an example non-stick coating 610 arranged along the flat portion 606, the jaw 111 being heated, the flat portion having a width 614 lower than the width 608 of the flat portion 606. This arrangement of the non-stick coating 610 illustrated in FIG. 6 allows the non-stick coating to be removed from jaw 111 which is heated.

In the example seal area of FIG. 6, the bottom seal 108 is formed from two portions of the same sheet 102. While in FIG. 6 the sheets have a same thickness, in some examples different thickness may be used, in which case the average thickness should be used to select the relative dimensions of the sheet thicknesses and flat portion width. As already explained, such specific range of flat portion width and of sheet thickness permitted obtaining a reliable seal for water-soluble unit dose article, while maintaining satisfactory dissolution of the water-soluble fibrous non-woven sheet during a laundry process.

In some examples, the flat portion width has a dimension of more than 4.5 times a thickness of the water-soluble fibrous non-woven sheet 102 and of less than 15 times the thickness of the water-soluble fibrous non-woven sheet. In some examples, the flat portion width has a dimension of more than 6 times a thickness of the water-soluble fibrous non-woven sheet 102 and of less than 10 times the thickness of the water-soluble fibrous non-woven sheet. In some examples, the flat portion width has a dimension of more than 7 times a thickness of the water-soluble fibrous non-woven sheet 2 and of less than 8 times the thickness of the water-soluble fibrous non-woven sheet.

In some examples, the flat portion width has a dimension of more than 0.5 mm and of less than 5 mm. In some examples, the flat portion width has a dimension of more than 0.75 mm and of less than 3 mm. In some examples, the flat portion width has a dimension of more than 1 mm and of less than 2 mm.

In some examples, the thickness of the water-soluble fibrous non-woven sheet is of less than 0.4 mm and of more than 0.1 mm.

In some examples, the flat portion width has a dimension less than a width of a main body of the first jaw along the same direction. In other examples, the flat portion width has a dimension corresponding or equal to a width of a main body of the first jam along the same direction. In some other examples not illustrated here, the flat portion width may have a dimension larger than a width of a main body of the first jam along the same direction.

In some examples, a main body of one of the jaws may comprise a plurality of sub-jaws.

In some examples, the second flat portion has a dimension along a direction perpendicular to the longitudinal direction of the seal of more than half the dimension of the flat portion width and of less than 5 times the dimension of the flat portion width. In some examples, the second flat portion has a dimension along a direction perpendicular to the longitudinal direction of the seal of more the dimension of the flat portion width and of less than 5 times the dimension of the flat portion width. In some examples, the second flat portion has a dimension along a direction perpendicular to the longitudinal direction of the seal of more than twice the dimension of the flat portion width and of less than 5 times the dimension of the flat portion width.

In some examples, the sealing jaws have a length along the longitudinal direction of the seal at least 2.5% longer than a length of the seal along the longitudinal direction of the seal. Such difference in length avoids or reduces an effect on the seal of heating discontinuities at extremities of the jaws. Such difference in length was found to increase seal reliability. In some examples, the sealing jaws have a length along the longitudinal direction of the seal at least 5% longer than a length of the seal along the longitudinal direction of the seal. In some examples, the sealing jaws have a length along the longitudinal direction of the seal at least 10% longer than a length of the seal along the longitudinal direction of the seal.

The jaws characteristics of the present disclosure should be understood as not limitative to either jaw 110 or jaw 111, they can be applied to both jaws.

In some examples, the granular laundry detergent comprised within said internal compartment weighs more than 5 grams and less than 200 grams. In some examples, the granular laundry detergent comprised within said internal compartment weighs more than 20 grams and less than 100 grams. The weight was found to have an impact on formation of the seal and, in some examples, on a cutting of the seal, due to a tension caused by the weight onto the seal region sandwiched between the jaws. Such tension was found to also be dependent on the seal length. Indeed, in some examples, the seal has a length along the longitudinal direction of the seal of more than 4 cm and of less than 11 cm.

In some examples, in order to increase packing efficiency and to reduce a relative proportion of packing material compared to granular detergent material in a water-soluble unit dose article, an example process comprises filling the internal compartment with the granular detergent to reduce a headspace in the sealed and filled internal compartment to less than 20% of a total volume of the internal compartment. An example process comprises filling the internal compartment with the granular detergent to reduce a headspace in the sealed and filled internal compartment to less than 15% of a total volume of the internal compartment. an example process comprises filling the internal compartment with the granular detergent to reduce a headspace in the sealed and filled internal compartment to less than 10% of a total volume of the internal compartment. An example process comprises filling the internal compartment with the granular detergent to reduce a headspace in the sealed and filled internal compartment to less than 5% of a total volume of the internal compartment. An example process comprises filling the internal compartment with the granular detergent to reduce a headspace in the sealed and filled internal compartment to less than 2% of a total volume of the internal compartment. It should be understood that a headspace reduction implies that a granular detergent fill level would get closer to a seal. Such headspace should be understood as a proportion of the internal volume which is substantially free of granular detergent in a free-standing sealed water-soluble unit dose article. Dust extraction as per examples hereby described permits reaching such reduced headspace levels while maintaining a sufficient manufacturing reliability.

In some examples, the flat portion comprises a removable layer in contact with the top seal, the removable layer having a surface energy of less than 19×10-5 N per centimeter. In some examples, the flat portion may itself be removable. An example of material having a surface energy of less than 19×10-5 N per centimeter is PTFE as mentioned above. This introduces a non-stick ability, and permits replacement in case of deterioration by heat of the layer having a surface energy of less than 19×10-5 N per centimeter. In some examples, the removable layer having a surface energy of less than 19×10-5 N per centimeter is also directly in contact with a heat source of the corresponding jaw to avoid sticking to the heat source (such as a hot wire or hot band).

Granular Laundry Detergent Composition

The water-soluble unit dose article comprises a granular laundry detergent. A granular laundry detergent should be understood as a laundry detergent which comprises a plurality of particles.

Typically, the granular laundry detergent composition is a fully formulated laundry detergent composition, not a portion thereof such as a spray-dried, extruded or agglomerate particle that only forms part of the laundry detergent composition. Typically, the granular detergent composition comprises a plurality of chemically different particles, such as spray-dried base detergent particles and/or agglomerated base detergent particles and/or extruded base detergent particles, in combination with one or more, typically two or more, or five or more, or even ten or more particles selected from: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, polyester particles, polyamine particles, terephthalate polymer particles, polyethylene glycol particles; aesthetic particles such as coloured noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, preferably these enzyme granulates comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

The perfume comprised in the perfume particles comprises perfume raw materials. The perfume raw material may comprise one or more, preferably two or more, perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene.

The PRMs may be characterized by their boiling points (B.P.) measured at the normal pressure (760 mm Hg), and their octanol/water partitioning coefficient (P), which may be described in terms of log P, determined according to the test method described below. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials.

Preferably, the perfume comprises a mixture of at least 3, or even at least 5, or at least 7 perfume raw materials. The perfume of the capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The perfume may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

Suitable perfumes comprise perfume materials selected from the group: (a) perfume materials having a C log P of less than 3.0 and a boiling point of less than 250° C. (quadrant 1 perfume materials); (b) perfume materials having a C log P of less than 3.0 and a boiling point of 250° C. or greater (quadrant 2 perfume materials); (c) perfume materials having a C log P of 3.0 or greater and a boiling point of less than 250° C. (quadrant 3 perfume materials); (d) perfume materials having a C log P of 3.0 or greater and a boiling point of 250° C. or greater (quadrant 4 perfume materials); and (e) mixtures thereof.

It may be preferred for the perfume to be in the form of a perfume delivery technology. Such delivery technologies further stabilize and enhance the deposition and release of perfume materials from the laundered fabric. Such perfume delivery technologies can also be used to further increase the longevity of perfume release from the laundered fabric. Suitable perfume delivery technologies include: perfume microcapsules, pro-perfumes, polymer assisted deliveries, molecule assisted deliveries, fiber assisted deliveries, amine assisted deliveries, cyclodextrin, starch encapsulated accord, zeolite and other inorganic carriers, and any mixture thereof. A suitable perfume microcapsule is described in WO2009/101593.

The use of a starch encapsulated accord (SEA) technology allows one to modify the properties of the perfume, for example, by converting a liquid perfume into a solid by adding ingredients such as starch. The benefit includes increased perfume retention during product storage, especially under non-aqueous conditions. Upon exposure to moisture, a perfume bloom may be triggered. Benefits at other moments of truth may also be achieved because the starch allows the product formulator to select PRMs or PRM concentrations that normally cannot be used without the presence of SEA. Another technology example includes the use of other organic and inorganic materials, such as silica to convert perfume from liquid to solid. Suitable SEAs as well as methods of making same may be found in USPA 2005/0003980 A1 and U.S. Pat. No. 6,458,754 B1.

In one aspect, SEA's may be made by preparing a mixture comprising starch, water, acid and a perfume, the acid being incorporated in the mixture in an amount sufficient to lower the pH of the starch-water mixture by at least 0.25 units; and atomizing and drying the mixture thereby forming encapsulated perfume. In the first step in the process of perfume encapsulation, an aqueous mixture is prepared comprising starch, water, perfume and acid. These ingredients may be added in any order, but usually the starch-water mixture is prepared first and subsequently, either sequentially or together, the acid and perfume are added. When they are added sequentially, the acid may be added prior to the ingredient for encapsulation. Alternatively, the acid is added after the ingredient for encapsulation. The concentration of starch in the aqueous mixture may be from as low as 5 or 10 wt % to as high as 60 or even 75 wt %. Generally the concentration of starch in the mixture is from 20 to 50 wt %, more usually around 25 to 40 wt % in the aqueous mixture.

Suitable starches can be made from raw starch, pregelatinized starch, modified starch derived from tubers, legumes, cereal and grains for example corn starch, wheat starch, rice starch, waxy corn starch, oat starch, cassava starch, waxy barley starch, waxy rice starch, sweet rice starch, amioca, potato starch, tapioca starch and mixtures thereof. Modified starches may be particularly suitable for use in the present invention, and these include hydrolyzed starch, acid thinned starch, starch having hydrophobic groups, such as starch esters of long chain hydrocarbons (C5 or greater), starch acetates, starch octenyl succinate and mixtures thereof. In one aspect, starch esters, such as starch octenyl succinates are employed.

The term "hydrolyzed starch" refers to oligosaccharide-type materials that are typically obtained by acid and/or enzymatic hydrolysis of starches, preferably corn starch. It may be preferred to include in the starch water-mixture, a starch ester. Particularly preferred are the modified starches comprising a starch derivative containing a hydrophobic group or both a hydrophobic and a hydrophilic group which has been degraded by at least one enzyme capable of cleaving the 1,4 linkages of the starch molecule from the non-reducing ends to produce short chained saccharides to provide high oxidation resistance while maintaining substantially high molecular weight portions of the starch base. The aqueous starch mixture may also include a plasticizer for the starch. Suitable examples include monosaccharides, disaccharides, oligosaccharides and maltodextrins, such as glucose, sucrose, sorbitol, gum arabic, guar gums and maltodextrin.

The acid used in the process of the invention may be any acid. Examples include sulphuric acid, nitric acid, hydrochloric acid, sulphamic acid and phosphonic acid. In one aspect, carboxylic organic acids are employed. In another aspect, organic acids comprising more than one carboxylic acid groups are employed. Examples of suitable organic acids include citric acid, tartaric acid, maleic acid, malic acid, succinic acid, sebacic acid, adipic acid, itaconic acid, acetic acid and ascorbic acid, etc. In one aspect, saturated acids, such as citric acid, are employed.

Suitable perfumes for encapsulation include the HIA perfumes including those having a boiling point determined at the normal standard pressure of about 760 mmHg of 275° C. or lower, an octanol/water partition coefficient P of about 2000 or higher and an odour detection threshold of less than or equal 50 parts per billion (ppb). In one aspect, the perfume may have log P of 2 or higher. Suitable perfumes may be selected from the group consisting of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, Alpha-damascone, Delta-damascone, Iso-damascone, Beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and Alpha-dihydro ionone, linalool, ethyllinalool, tetrahydrolinalool, and dihydromyrcenol. Suitable ingredients can be obtained from Givaudan of Mount Olive, New Jersey, USA, International Flavors & Fragrances of South Brunswick, New Jersey, USA, or Quest of Naarden, Netherlands.

Following the formation of the aqueous mixture comprising starch, water, perfumes and acid, the mixture is mixed under high shear to form an emulsion or dispersion of ingredient for encapsulation in the aqueous starch solution.

Any suitable technique may then be used for the final stage of processing where the aqueous mixture including acid and perfumes is atomised and dried. Suitable techniques include, but are not limited to those known in the art including spray drying, extrusion, spray chilling/crystallisation methods, fluid bed coating and the use of phase transfer catalysts to promote interfacial polymerization. Spray efficiencies may be increased by methods known in the art, such as by using high drying towers, lightly oiling the chamber walls, or using preconditioned air in which the moisture has been substantially removed. The particle size range of SEA is comprised between 1 micron and 20 microns.

Method to Determine log P:

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

In some examples, the perfume particles have a median particle size range of less than 100 microns and of more than 5 microns. In some examples, the perfume particles have a median particle size range of less than 60 microns and of more than 10 microns. In some examples, the perfume particles have a median particle size range of less than 50 microns and of more than 15 microns. A median particle size should be understood as a volume-weighted median particle size. Volume-weighted average diameter is determined according to the method provided in the Test Method section below.

Perfume Particle Size Determination:

Depending on the relative size of the particle, one of two methods is employed: image analysis if the approximate volume-weighted median particle size of the population is 10 μm or greater, or microscopy if the approximate volume-weighted median particle size of the population is less than 10 μm. These methods are described in more detail below.

A. Image Analysis

The volume-weighted median particle size is calculated from images taken from the sample flowing through a variable size flow cell. This instrument is specifically designed for image analysis device for liquid applications (Occhio FC200S). The sample is pumped via a syringe pump at very low speed through the flow cell, while the sample passes through the flow cell images are taken at set times. The speed is matched with the frame speed of the camera and it is dependent on the behaviour of the sample and the particles it contains. The flow cell sizes of 250 and 500 µm may be used. Callisto version 2013.13 software is used to read out pixels and calculate size and shape parameters. The size descriptor used is ISO area diameter.

Illumination is a red-led light source, adjustment of illumination is done manually until a proper grayscale detection via grayscale threshold of the particles is possible. Hardware magnification is dependent on the size of the particles, for example 6× or 9×.

B. Microscopy

The volume-weighted median particle size of the particles is calculated from the values obtained by microscopically observing and measuring the diameter of around 900 particles randomly sampled. The microscope used is the Leica DM6000B. The magnification of the microscope is set to 200×. The outputs obtained after the microscopy analysis are: (1) list of diameters detected; and (2) counts per each diameter size detected.

Therefore, the volume (V) of each particle is calculated with the following equation:

$$V = 4/3\pi r3$$

where r is the radius of each detected particle. Finally, the volume-weighted median particle size is calculated (e.g., via a spreadsheet, such those created in Microsoft Excel™), assuming that each particle is a sphere.

Suitable granular laundry detergent compositions can comprise a detergent ingredient selected from: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photobleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds suppressors; and any combination thereof.

Suitable granular laundry detergent compositions may have a low buffering capacity. Such laundry detergent compositions typically have a reserve alkalinity to pH 9.5 of less than 5.0 gNaOH/100 g. These low buffered laundry detergent compositions typically comprise low levels of carbonate salt.

Suitable hueing agents include small molecule dyes, typically falling into the Colour Index (C.I.) classifications of Acid, Direct, Basic, Reactive (including hydrolysed forms thereof) or Solvent or Disperse dyes, for example classified as Blue, Violet, Red, Green or Black, and provide the desired shade either alone or in combination. Preferred such hueing agents include Acid Violet 50, Direct Violet 9, 66 and 99, Solvent Violet 13 and any combination thereof.

Many hueing agents are known and described in the art which may be suitable for the present invention, such as hueing agents described in WO2014/089386.

Suitable hueing agents include phthalocyanine and azo dye conjugates, such as described in WO2009/069077.

Suitable hueing agents may be alkoxylated. Such alkoxylated compounds may be produced by organic synthesis that may produce a mixture of molecules having different degrees of alkoxylation. Such mixtures may be used directly to provide the hueing agent, or may undergo a purification step to increase the proportion of the target molecule. Suitable hueing agents include alkoxylated bis-azo dyes, such as described in WO2012/054835, and/or alkoxylated thiophene azo dyes, such as described in WO2008/087497 and WO2012/166768.

The hueing agent may have the following structure:

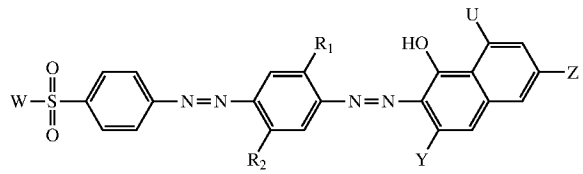

wherein:
$R_1$ and $R_2$ are independently H, alkyl, alkoxy, alkyleneoxy, alkyl capped alkyleneoxy, polyalkyleneoxy, alkyl capped polyalkyleneoxy, or amido;
W is a substituted amino moiety;
U is a hydrogen, an amino group or an amino group substituted with an acyl group;
Y is a hydrogen or a sulfonic acid moiety; and
Z is a sulfonic acid moiety or an amino group substituted with a phenyl group.

The hueing agent may be incorporated into the detergent composition as part of a reaction mixture which is the result of the organic synthesis for a dye molecule, with optional purification step(s). Such reaction mixtures generally comprise the dye molecule itself and in addition may comprise un-reacted starting materials and/or by-products of the organic synthesis route. Suitable hueing agents can be incorporated into hueing dye particles, such as described in WO 2009/069077.

The granular laundry detergent may comprise from 1 wt % to 50 wt % of a surfactant system. Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

Suitable anionic detersive surfactants include sulphonate and sulphate detersive surfactants.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, other suitable LAB include high 2-phenyl LAB, such as those supplied by Sasol under the tradename Hyblene®.

Suitable sulphate detersive surfactants include alkyl sulphate, preferably $C_{8-18}$ alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3 and most preferably from 0.5 to 1.5.

The alkyl sulphate, alkyl alkoxylated sulphate and alkyl benzene sulphonates may be linear or branched, substituted or un-substituted, and may be derived from petrochemical material or biomaterial.

Other suitable anionic detersive surfactants include alkyl ether carboxylates.

Suitable anionic detersive surfactants may be in salt form, suitable counter-ions include sodium, calcium, magnesium, amino alcohols, and any combination thereof. A preferred counter-ion is sodium.

The surfactant system comprises linear alkylbenzene sulphonate and alkyl alkoxylated alcohol having an average degree of alkoxylation of from 1 to 10. The weight ratio of linear alkylbenzene sulphonate to alkyl alkoxylated alcohol is in the range of from 3:1 to 300:1.

The granular laundry detergent may comprise from 1 wt % to 30 wt % of a surfactant system, wherein the surfactant system comprises linear alkylbenzene sulphonate and alkyl alkoxylated alcohol having an average degree of alkoxylation of from 1 to 10, and wherein the weight ratio of linear alkylbenzene sulphonate to alkyl alkoxylated alcohol is in the range of from 10:1 to 200:1.

At least part of the linear alkylbenzene sulphonate may be present in the granular laundry detergent in the form of a spray-dried particle, and wherein the spray-dried particle comprises from 10 wt % to 80 wt % linear alkylbenzene sulphonate. Preferably, the spray-dried particle comprises from 40 wt % to 80 wt % linear alkylbenzene sulphonate.

At least part of the linear alkylbenzene sulphonate may be present in the granular laundry detergent in the form of a flake.

At least part of the linear alkylbenzene sulphonate may be present in the granular laundry detergent in the form of an agglomerate.

The surfactant system may comprise alkyl sulphate, preferably, wherein the alkyl sulphate is a $C_{12}$-$C_{14}$ alkyl sulphate. Preferably, the weight ratio of linear alkylbenzene sulphonate to alkyl sulphate is in the range of from 2:1 to 60:1.

Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol.

Suitable non-ionic detersive surfactants include alkyl alkoxylated alcohols, preferably $C_{8-18}$ alkyl alkoxylated alcohol, preferably a $C_{8-18}$ alkyl alkoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable nonionic detersive surfactants include secondary alcohol-based detersive surfactants.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$(R)(R_1)(R_2)(R_3)N^+X^-$ wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Suitable zwitterionic detersive surfactants include amine oxides and/or betaines.

Suitable polymers include carboxylate polymers, soil release polymers, anti-redeposition polymers, cellulosic polymers, care polymers and any combination thereof.

The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Another suitable carboxylate polymer is a co-polymer that comprises: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

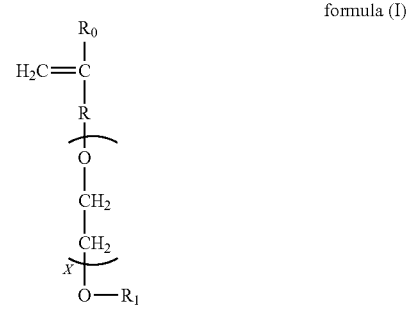

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

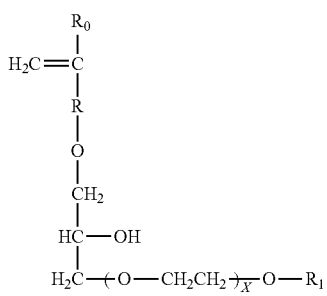

formula (II)

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

It may be preferred that the polymer has a weight average molecular weight of at least 50 kDa, or even at least 70 kDa.

The composition may comprise a soil release polymer. A suitable soil release polymer has a structure as defined by one of the following structures (I), (II) or (III):

  (I)

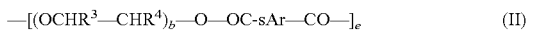  (II)

  (III)

wherein:
- a, b and c are from 1 to 200;
- d, e and f are from 1 to 50;
- Ar is a 1,4-substituted phenylene;
- sAr is 1,3-substituted phenylene substituted in position 5 with $SO_3Me$;
- Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
- $R^1$, $R^2$, $R^3$, $R^4$, $R^5$ and $R^6$ are independently selected from H or $C_1$-$C_{18}$ n- or iso-alkyl; and
- $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are sold by Clariant under the TexCare® series of polymers, e.g. TexCare® SRN240 and TexCare® SRA300. Other suitable soil release polymers are sold by Solvay under the Repel-o-Tex® series of polymers, e.g. Repel-o-Tex® SF2 and Repel-o-Tex® Crystal.

Suitable anti-redeposition polymers include polyethylene glycol polymers and/or polyethyleneimine polymers.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide unit can be less than 0.02, or less than 0.016, the average number of graft sites per ethylene oxide unit can be in the range of from 0.010 to 0.018, or the average number of graft sites per ethylene oxide unit can be less than 0.010, or in the range of from 0.004 to 0.008.

Suitable polyethylene glycol polymers are described in WO08/007320.

A suitable polyethylene glycol polymer is Sokalan HP22.

Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof.

Suitable carboxymethyl celluloses have a degree of carboxymethyl substitution from 0.5 to 0.9 and a molecular weight from 100,000 Da to 300,000 Da.

Suitable carboxymethyl celluloses have a degree of substitution greater than 0.65 and a degree of blockiness greater than 0.45, e.g. as described in WO09/154933.

Suitable care polymers include cellulosic polymers that are cationically modified or hydrophobically modified. Such modified cellulosic polymers can provide anti-abrasion benefits and dye lock benefits to fabric during the laundering cycle. Suitable cellulosic polymers include cationically modified hydroxyethyl cellulose.

Other suitable care polymers include dye lock polymers, for example the condensation oligomer produced by the condensation of imidazole and epichlorhydrin, preferably in ratio of 1:4:1. A suitable commercially available dye lock polymer is Polyquart® FDI (Cognis).

Other suitable care polymers include amino-silicone, which can provide fabric feel benefits and fabric shape retention benefits.

Suitable bleach includes sources of hydrogen peroxide, bleach activators, bleach catalysts, pre-formed peracids and any combination thereof. A particularly suitable bleach includes a combination of a source of hydrogen peroxide with a bleach activator and/or a bleach catalyst.

Suitable sources of hydrogen peroxide include sodium perborate and/or sodium percarbonate.

Suitable bleach activators include tetra acetyl ethylene diamine and/or alkyl oxybenzene sulphonate.

The composition may comprise a bleach catalyst. Suitable bleach catalysts include oxaziridinium bleach catalysts, transition metal bleach catalysts, especially manganese and iron bleach catalysts. A suitable bleach catalyst has a structure corresponding to general formula below:

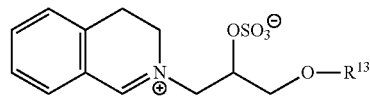

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl.

Suitable pre-form peracids include phthalimido-peroxycaproic acid.

Suitable enzymes include lipases, proteases, cellulases, amylases and any combination thereof.

Suitable proteases include metalloproteases and/or serine proteases. Examples of suitable neutral or alkaline proteases include: subtilisins (EC 3.4.21.62); trypsin-type or chymotrypsin-type proteases; and metalloproteases. The suitable proteases include chemically or genetically modified mutants of the aforementioned suitable proteases.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Preferenz P® series of proteases including Preferenz® P280, Preferenz® P281, Preferenz® P2018-C, Preferenz® P2081-WE, Preferenz® P2082-EE and Preferenz® P2083-A/J, Properase®, Purafect®, Purafect Prime®, Purafect Ox®, FN3®, FN4®, Excellase® and Purafect OXP® by DuPont, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (Bacillus alkalophilus subtilisin with mutations A230V+S256G+S259N) from Kao.

A suitable protease is described in WO11/140316 and WO11/072117.

Suitable amylases are derived from AA560 alpha amylase endogenous to Bacillus sp. DSM 12649, preferably having the following mutations: R118K, D183*, G184*, N195F, R320K, and/or R458K. Suitable commercially available amylases include Stainzyme®, Stainzyme® Plus, Natalase, Termamyl®, Termamyl® Ultra, Liquezyme® SZ, Duramyl®, Everest® (all Novozymes) and Spezyme® AA, Preferenz S® series of amylases, Purastar® and Purastar® Ox Am, Optisize® HT Plus (all Du Pont).

A suitable amylase is described in WO06/002643.

Suitable cellulases include those of bacterial or fungal origin. Chemically modified or protein engineered mutants are also suitable. Suitable cellulases include cellulases from the genera Bacillus, Pseudomonas, Humicola, Fusarium, Thielavia, Acremonium, e.g., the fungal cellulases produced from Humicola insolens, Myceliophthora thermophila and Fusarium oxysporum.

Commercially available cellulases include Celluzyme®, Carezyme®, and Carezyme® Premium, Celluclean® and Whitezyme® (Novozymes A/S), Revitalenz® series of enzymes (Du Pont), and Biotouch® series of enzymes (AB Enzymes). Suitable commercially available cellulases include Carezyme® Premium, Celluclean® Classic. Suitable cellulases are described in WO07/144857 and WO10/056652.

Suitable lipases include those of bacterial, fungal or synthetic origin, and variants thereof. Chemically modified or protein engineered mutants are also suitable. Examples of suitable lipases include lipases from Humicola (synonym Thermomyces), e.g., from H. lanuginosa (T. lanuginosus).

The lipase may be a "first cycle lipase", e.g. such as those described in WO06/090335 and WO13/116261. In one aspect, the lipase is a first-wash lipase, preferably a variant of the wild-type lipase from Thermomyces lanuginosus comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; and TfuLip2, e.g. as described in WO2011/084412 and WO2013/033318.

Other suitable enzymes are bleaching enzymes, such as peroxidases/oxidases, which include those of plant, bacterial or fungal origin and variants thereof. Commercially available peroxidases include Guardzyme® (Novozymes A/S). Other suitable enzymes include choline oxidases and perhydrolases such as those used in Gentle Power Bleach™.

Other suitable enzymes include pectate lyases sold under the tradenames X-Pect®, Pectaway® (from Novozymes A/S, Bagsvaerd, Denmark) and PrimaGreen® (DuPont) and mannanases sold under the tradenames Mannaway® (Novozymes A/S, Bagsvaerd, Denmark), and Mannastar® (Du Pont).

The granular laundry detergent comprises a plurality of particles, wherein the plurality of particles comprise zeolite particles, for example zeolite particles comprising zeolite builder. Indeed, the granular laundry detergent may have a composition comprising a zeolite builder. The granular laundry detergent composition may comprise from 0.1 wt % to 5.0 wt % zeolite builder, or 3.0 wt % zeolite builder. In other words, the granular laundry detergent composition may comprise between 0.1 wt % to 5.0 wt % zeolite builder, or 3.0 wt % builder.

In some examples, the granular laundry detergent composition comprises between 1.0 wt % and 4.0 wt % zeolite builder.

In some examples, the granular laundry detergent composition comprises between 1.5 wt % and 3.5 wt % zeolite builder.

In some examples, the granular laundry detergent composition comprises between 2.0 wt % and 3.0 wt % zeolite builder.

Typical zeolite builders include zeolite A, zeolite P and zeolite MAP.

The composition may comprise phosphate builder. The composition may comprise from 0 wt % to 5 wt % phosphate builder, or to 3 wt %, phosphate builder. The composition may even be substantially free of phosphate builder; substantially free means "not deliberately added". A typical phosphate builder is sodium tri-polyphosphate.

The composition may comprise carbonate salt. The composition may comprise from 0 wt % to 10 wt % carbonate salt, or to 5 wt % carbonate salt. The composition may even be substantially free of carbonate salt; substantially free means "not deliberately added". Suitable carbonate salts include sodium carbonate and sodium bicarbonate.

The composition may comprise silicate salt. The composition may comprise from 0 wt % to 10 wt % silicate salt, or to 5 wt % silicate salt. A preferred silicate salt is sodium silicate, especially preferred are sodium silicates having a $Na_2O:SiO_2$ ratio of from 1.0 to 2.8, preferably from 1.6 to 2.0.

A suitable sulphate salt is sodium sulphate.

Suitable fluorescent brighteners include: di-styryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)];amino}stilbene-2-2' disulfonate, disodium 4,4'-bis{[(4-anilino-6-morpholino-1,3,5-triazin-2-yl)]amino} stilbene-2-2' disulfonate, and disodium 4,4'-bis(2-sulfostyryl)biphenyl.

A suitable fluorescent brightener is C.I. Fluorescent Brightener 260, which may be used in its beta or alpha crystalline forms, or a mixture of these forms.

The composition may also comprise a chelant selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). A preferred chelant is ethylene diamine-N'N'-disuccinic acid (EDDS) and/or hydroxyethane diphosphonic acid (HEDP). The composition preferably comprises ethylene diamine-N'N'-disuccinic acid or salt thereof. Preferably the ethylene diamine-N'N'-disuccinic acid is in S,S enantiomeric form. Preferably the composition comprises 4,5-dihydroxy-m-benzenedisulfonic acid disodium salt. Preferred chelants may also function as calcium carbonate crystal growth inhibitors such as: 1-hydroxyethanediphosphonic acid (HEDP) and salt thereof; N,N-dicarboxymethyl-2-aminopentane-1,5-dioic acid and salt thereof; 2-phosphonobutane-1,2,4-tricarboxylic acid and salt thereof; and combination thereof.

Suitable dye transfer inhibitors include polyamine N-oxide polymers, copolymers of N-vinylpyrrolidone and N-vinylimidazole, polyvinylpyrrolidone, polyvinyloxazolidone, polyvinylimidazole and mixtures thereof. Preferred are poly(vinyl pyrrolidone), poly(vinylpyridine betaine), poly(vinylpyridine N-oxide), poly(vinyl pyrrolidone-vinyl imidazole) and mixtures thereof. Suitable commercially available dye transfer inhibitors include PVP-K15 and K30 (Ashland), Sokalan® HP165, HP50, HP53, HP59, HP56K, HP56, HP66 (BASF), Chromabond® S-400, S403E and S-100 (Ashland).

Suitable silicones include polydimethylsiloxane and amino-silicones. Suitable silicones are described in WO05075616.

Typically, the particles of the composition can be prepared by any suitable method. For example: spray-drying, agglomeration, extrusion and any combination thereof.

Typically, a suitable spray-drying process comprises the step of forming an aqueous slurry mixture, transferring it through at least one pump, preferably two pumps, to a pressure nozzle. Atomizing the aqueous slurry mixture into a spray-drying tower and drying the aqueous slurry mixture to form spray-dried particles. Preferably, the spray-drying tower is a counter-current spray-drying tower, although a co-current spray-drying tower may also be suitable.

Typically, the spray-dried powder is subjected to cooling, for example an air lift. Typically, the spray-drying powder is subjected to particle size classification, for example a sieve, to obtain the desired particle size distribution. Preferably, the spray-dried powder has a particle size distribution such that weight average particle size is in the range of from 300 micrometers to 500 micrometers, and less than 10 wt % of the spray-dried particles have a particle size greater than 2360 micrometers.

It may be preferred to heat the aqueous slurry mixture to elevated temperatures prior to atomisation into the spray-drying tower, such as described in WO2009/158162.

It may be preferred for anionic surfactant, such as linear alkyl benzene sulphonate, to be introduced into the spray-drying process after the step of forming the aqueous slurry mixture: for example, introducing an acid precursor to the aqueous slurry mixture after the pump, such as described in WO 09/158449.

It may be preferred for a gas, such as air, to be introduced into the spray-drying process after the step of forming the aqueous slurry, such as described in WO2013/181205.

It may be preferred for any inorganic ingredients, such as sodium sulphate and sodium carbonate, if present in the aqueous slurry mixture, to be micronized to a small particle size such as described in WO2012/134969.

Typically, a suitable agglomeration process comprises the step of contacting a detersive ingredient, such as a detersive surfactant, e.g. linear alkyl benzene sulphonate (LAS) and/or alkyl alkoxylated sulphate, with an inorganic material, such as sodium carbonate and/or silica, in a mixer. The agglomeration process may also be an in-situ neutralization agglomeration process wherein an acid precursor of a detersive surfactant, such as LAS, is contacted with an alkaline material, such as carbonate and/or sodium hydroxide, in a mixer, and wherein the acid precursor of a detersive surfactant is neutralized by the alkaline material to form a detersive surfactant during the agglomeration process.

Other suitable detergent ingredients that may be agglomerated include polymers, chelants, bleach activators, silicones and any combination thereof.

The agglomeration process may be a high, medium or low shear agglomeration process, wherein a high shear, medium shear or low shear mixer is used accordingly. The agglomeration process may be a multi-step agglomeration process wherein two or more mixers are used, such as a high shear mixer in combination with a medium or low shear mixer. The agglomeration process can be a continuous process or a batch process.

It may be preferred for the agglomerates to be subjected to a drying step, for example to a fluid bed drying step. It may also be preferred for the agglomerates to be subjected to a cooling step, for example a fluid bed cooling step.

Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

It may be preferred for fines and over-sized agglomerates to be recycled back into the agglomeration process. Typically, over-sized particles are subjected to a size reduction step, such as grinding, and recycled back into an appropriate place in the agglomeration process, such as the mixer. Typically, fines are recycled back into an appropriate place in the agglomeration process, such as the mixer.

It may be preferred for ingredients such as polymer and/or non-ionic detersive surfactant and/or perfume to be sprayed onto base detergent particles, such as spray-dried base detergent particles and/or agglomerated base detergent particles. Typically, this spray-on step is carried out in a tumbling drum mixer.

As mentioned above, water-soluble unit dose article according to this disclosure should be suitable for use in a process for laundering fabrics. Such a process may comprise the steps of;
  a. providing an automatic laundry washing machine wherein the automatic laundry washing machine comprises a drum and a drawer;
  b. adding the water-soluble unit dose article according to the present invention to the drawer, the drum or a mixture thereof together with fabrics to be washed to the drum;
  c. starting a wash operation in the automatic laundry washing machine.

Preferably, the water-soluble unit dose article is added to sufficient water to dilute the liquid laundry detergent composition by a factor of at least 300 fold to create a wash liquor and contacting fabrics to be washed with said wash liquor in the drum of the washing machine. Without wishing to be bound by theory, when the water-soluble unit dose article is added to water, the water-soluble film dissolves releasing the internal liquid laundry detergent composition into the water. The liquid laundry detergent composition disperses in the water to create the wash liquor.

Preferably the wash liquor may comprise between 1 L and 64 L, preferably between 2 L and 32 L, more preferably between 3 L and 20 L of water.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

Preferably, the wash liquor comprises between 1 kg and 20 kg, preferably between 3 kg and 15 kg, most preferably between 5 and 10 kg of fabrics.

The wash liquor may comprise water of any hardness preferably varying between 0 gpg to 40 gpg.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Dust Extraction Conduct

The water-soluble fibrous non-woven sheet is not airtight because of its fibrous structure. The water-soluble fibrous non-woven sheet presents an air permeability. The water-soluble fibrous non-woven sheet has an air permeability comprised between 5 $m^3/m^2/min$ and 200 $m^3/m^2/min$.

In some examples, the water-soluble fibrous non-woven sheet has an air permeability comprised between 50 $m^3/m^2/min$ and 150 $m^3/m^2/min$.

In some examples, the water-soluble fibrous non-woven sheet has an air permeability comprised between 75 $m^3/m^2/min$ and 125 $m^3/m^2/min$.

In some examples, the water-soluble fibrous non-woven sheet has an air permeability comprised between 85 $m^3/m^2/min$ and 105 $m^3/m^2/min$.

Air permeability of the water-soluble fibrous non-woven sheet can be measured with the standard test method ASTM D737. ASTM D737 describes a calibrated air flow apparatus, a sample clamping device and a means of measuring air flow. The test involves clamping a test specific of the water-soluble fibrous non-woven sheet (the fabric) over a circular opening in the apparatus and measuring the rate of air flow through the fabric. The result is expressed as the cubic feet of air per minute (CFM) that passes through a square foot of fabric. The air permeability of the fabric is determined by comparing the test results to a standard reference fabric or by conducting multiple tests under different pressure conditions. The test is repeated several times to obtain an average result for the sample.

At least some particles of the granular laundry detergent can leak through the water-soluble fibrous non-woven sheet, thus leak out of the water-soluble dose unit article. FIG. 1 illustrates an example wherein at least some particles of the granular laundry detergent 106 leak through the water-soluble fibrous non-woven sheet 102 and fall onto an area 114 surrounding a top section of the sealing jaws 110, 111. In some examples, the area surrounding a top section of the sealing jaws is delimited by the top section of the sealing jaws, the area comprising the bottom seal, the area comprising for example a volume of the area comprising a center point of the bottom seal, the volume of the area being for example elongated along a direction of the bottom seal (direction Z), the volume of the area comprising for example more than 1 $cm^3$, for example more than 5 $cm^3$, for example more than 10 $cm^3$. In some examples, the volume of the area is of less than 125 $cm^3$.

In some examples, a dust concentration in the area 114 is lower in the presence of gas flow than in the absence of gas flow as the internal compartment 102 is getting filled. In some examples, a dust concentration D1 in the area 114 in the presence of gas flow as the internal compartment is getting filled is at most 80% of a dust concentration D2 in the area 114 in the absence of gas flow as the internal compartment is getting filled. In some examples, a dust concentration D1 in the area 114 in the presence of gas flow as the internal compartment is getting filled is at most 60% of a dust concentration D2 in the area 114 in the absence of gas flow as the internal compartment is getting filled. In some examples, a dust concentration D1 in the area 114 in the presence of gas flow as the internal compartment is getting filled is at most 40% of a dust concentration D2 in the area 114 in the absence of gas flow as the internal compartment is getting filled. D1 and D2 should be measured in a same manner using a same suspended particulate matter measurement method, using for example an optical photodetector or an Aethalometer.

FIG. 1-5 further disclose an example first dust extraction conduct. The dust extraction conducts or conduct should be understood as a longitudinal channel.

FIG. 1-5 illustrate example first dust extraction conducts which comprise an end 120 proximal to the bottom seal 108. In some examples as illustrated in FIGS. 1-2 and 4-5, the first dust extraction conduct 116 has a generally rectangular cross-section, however it may have any suitable cross-section including, square, triangular, circular, oval, hexagonal or a mixture thereof.

In some examples, the first extraction dust conduct has a width along direction Y comprised between 50 mm and 200 mm.

In some examples, the first extraction dust conduct width is comprised between 100 mm and 180 mm.

In some examples, the first extraction dust conduct width is comprised between 110 mm and 170 mm.

In some examples, the first extraction dust conduct width is comprised between 140 mm and 160 mm.

The dust extraction conducts or conduct can be made of metal or of plastics.

In some examples as illustrated in FIG. 1, the first dust extraction conduct 116 shown has a longitudinal axis, the longitudinal axis having a tilt angle α with respect to the direction X. As illustrated in FIG. 2-5, in some other examples the first dust extraction conduct 116 shown is parallel to the direction X.

In some examples, the dust extraction conducts or conduct comprise an inlet connected to the area surrounding a top section of the sealing jaws, and an outlet (not illustrated) connected to an outside of the system distant from the water-soluble dose unit article. The inlet and the outlet of the dust extraction conduct should be understood as apertures connecting an outside and an inside of the dust extraction conduct.

In some examples, the first extraction conduct directs a gas flow away from the area surrounding a top section of the sealing jaws. In other words, the extraction conducts or conduct direct a gas flow from the inlet to the outlet. To direct the gas flow away should be understood to transfer the gas flow. In these examples, the first extraction conduct allows to direct at least a portion of the leaking particles located in the area surrounding a top section of the sealing jaws away from the area surrounding a top section of the sealing jaws.

Figure 4:
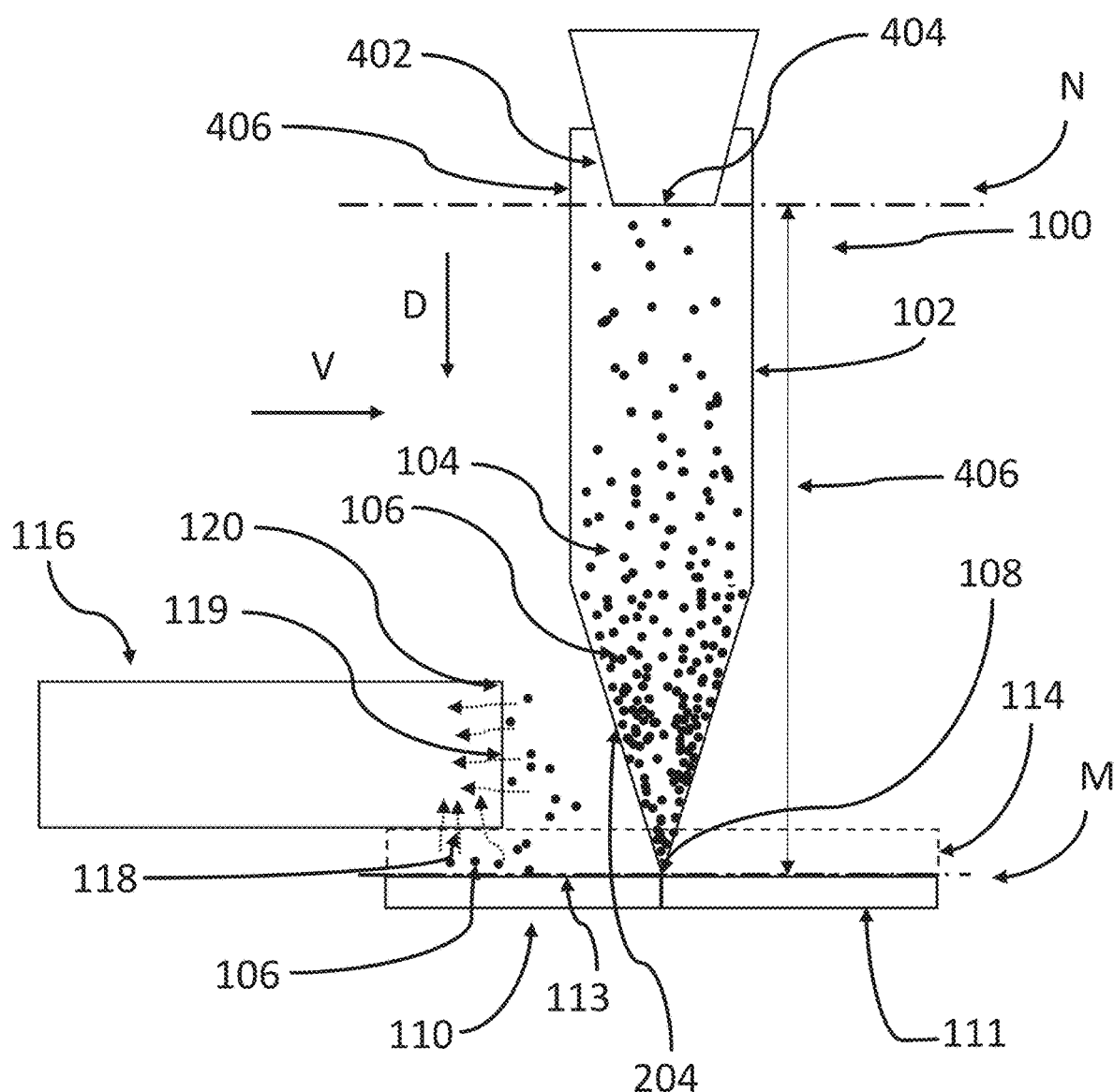
Figure 5:
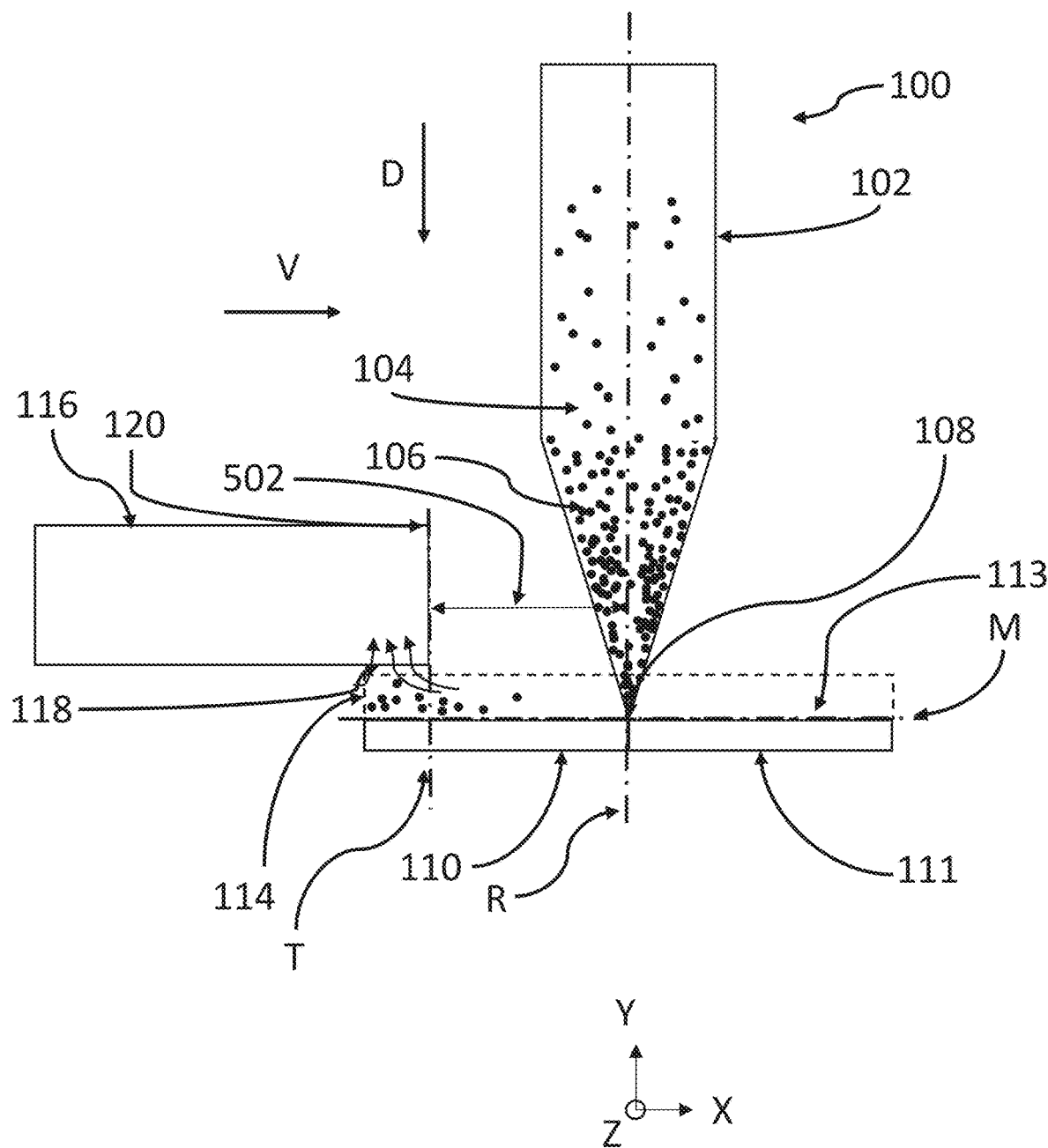

As illustrated in the example systems in FIG. 1, 4-5, the first dust extraction conduct 116 directs a gas flow away from the area 114 surrounding the top section 113 of the sealing jaws 110, 111. In the example systems in FIG. 1, 4-5, at least some leaking particles 107 that leaked out of the water-soluble fibrous non-woven sheet 102 and may have fallen onto the area 114 surrounding the top section 113 of the sealing jaws 110, 111 enter the first dust extraction conduct 116 through the inlet 118 and are directed away from the area 114.

In some examples, the gas flow is an inert gas flow, for example the gas flow can be an air flow.

In some examples, the dust extraction conducts or conduct comprises a fan (not illustrated) between the inlet and outlet which circulates an internal gas flow from the inlet to the outlet.

In some examples, the inlet has a rectangular shape, however it may have any suitable shape including, square, triangular, circular, oval, hexagonal or a mixture thereof.

In some examples, the inlet has a rectangular shape, the rectangular shape having a length along direction Z and a width along direction Y, the length corresponding to a length of the jaws along direction Z, the length being significantly longer than the width, for example more than 10 times the width or more than 20 times the width. A relatively smaller width may produce a venturi effect promoting dust extraction. A relatively smaller width may help precisely directing the gas flow towards a desired target area such as the top section of the sealing jaws, the bottom section of the internal compartment or both.

In some examples, the dust extraction conduct comprises a plurality of inlets or nozzles. In some examples, the plurality of inlets is arranged as a rectangular or square matrix or as a plurality of matrixes. In some examples, the arrangement of the inlets is heterogeneous, producing for example a higher gas flow in a central area of the jaws along direction Z compared to a lower gas flow in peripheral areas of the jaws along direction Z, in particular in order to focus dust extraction in such central area. In some examples, the arrangement of inlets produces a homogeneous gas flow along the jaws. In some examples, such heterogeneity or homogeneity may be produced by shaping a single inlet.

While not represented, in some examples the dust extraction conducts comprise a streamlined nozzle which comprises the inlet at its end, allowing a precise extraction of particles located in a certain target zone.

Figure 3B:
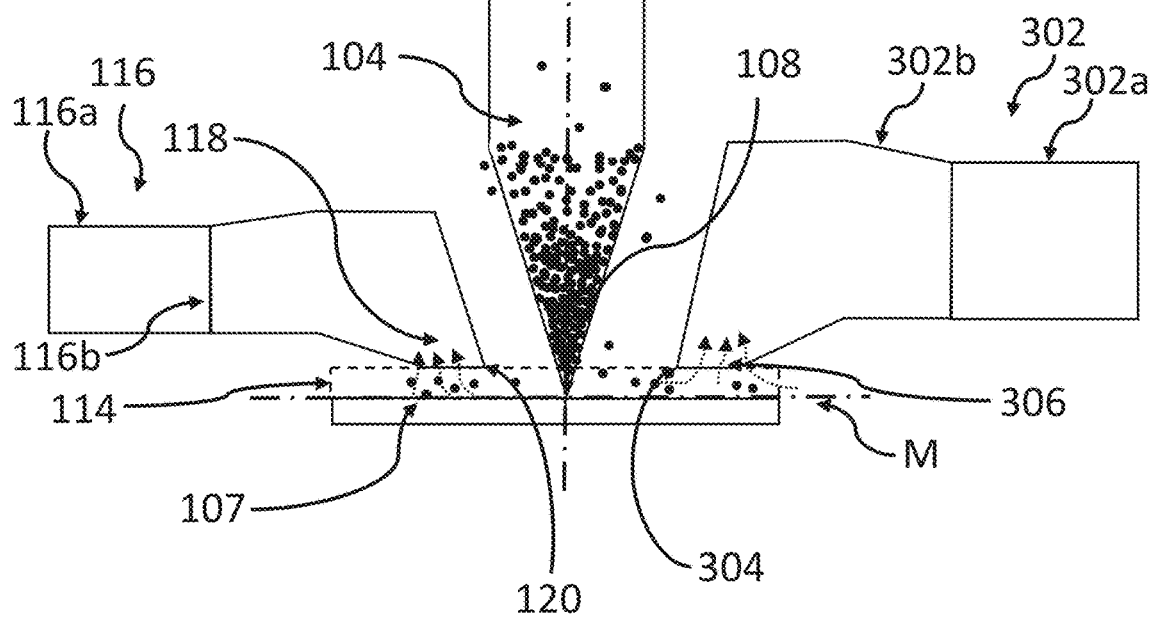

As illustrated in the example system of FIG. 3B, the dust extraction conducts can comprise a downstream (in relation to the gas flow) cylindrical part 116a, 302a and an upstream frustoconical part 116b 302b proximal to the bottom seal, wherein the frustoconical part expands according to the upstream direction. In some examples where the inlets are arranged at an upstream end of the conducts, this expansion allows the conducts to capture a high proportion of leaking particles. The terms "upstream" and "downstream" should be understood as according to the gas flow, the upstream side being proximal to the bottom seal, the downstream side being far from the bottom seal. In some examples, the upstream cylindrical part and the downstream frustoconical part are assembled with a seal or by welding for example. In some examples, the upstream part is a counter form of the bottom section of the water-soluble unit dose article, allowing a more rigorous extraction of at least some leaking particles. In some examples, the upstream part is a concatenation of a plurality of frustoconical parts, the upstream part comprises a plurality of frustoconical parts.

In some other examples, the dust extraction conducts or conduct direct the gas flow away from the bottom section of the internal compartment. In these examples, the first extraction conduct allows to direct at least a portion of the leaking particles located proximal to the bottom section of the internal compartment and away from the bottom section of the internal compartment.

Figure 2:
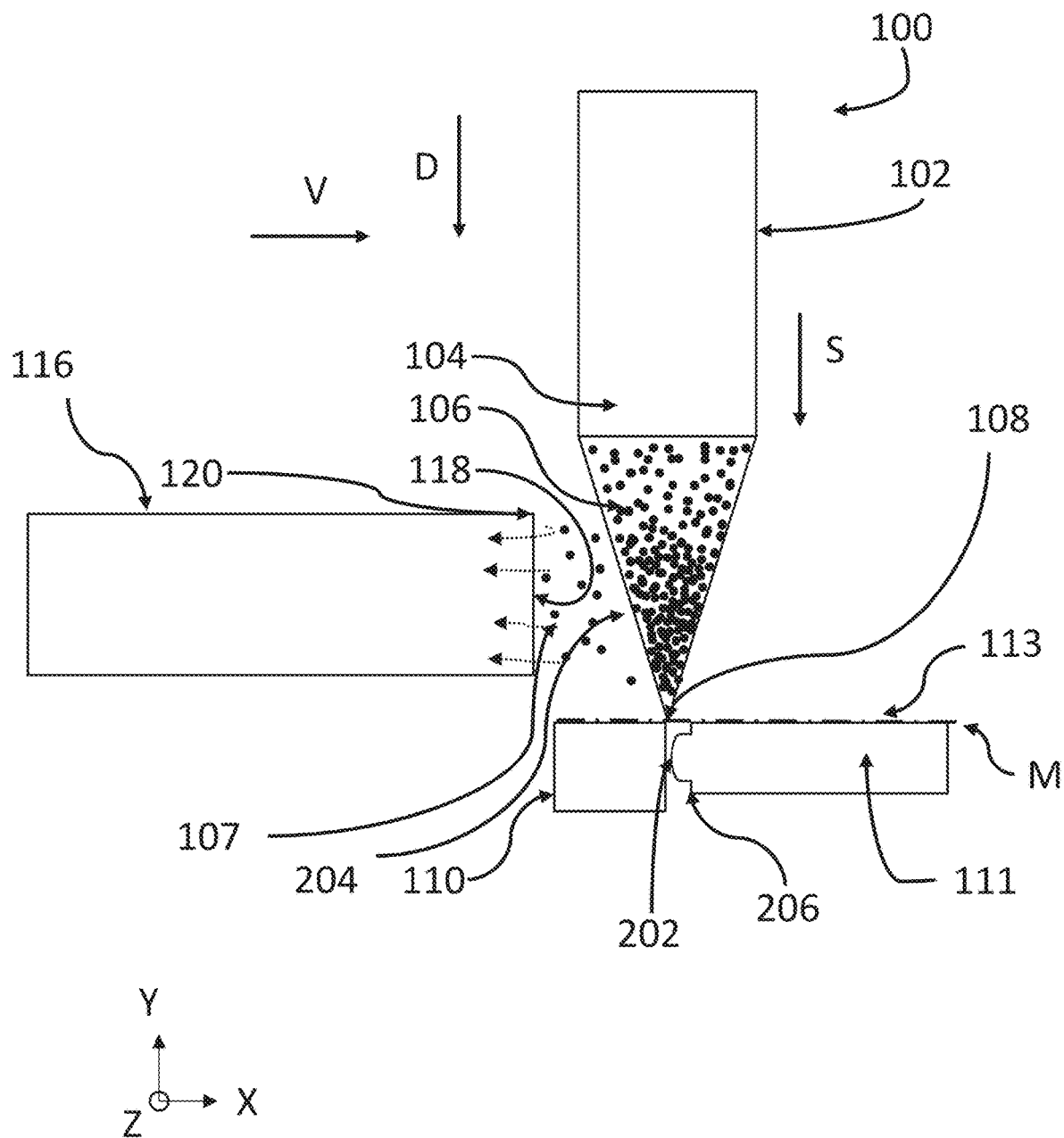

As illustrated in the example system in FIG. 2, the first dust extraction conducts 116 direct the gas flow away from a bottom section 204 of the internal compartment 104. The bottom section 204 shown has a triangular shape, however it may have any suitable shape including, square, triangular, circular, oval, hexagonal or a mixture thereof. In the example systems in FIG. 2, at least some leaking particles 107 that leaked out of the water-soluble fibrous non-woven sheet 102 through the bottom section 204 enter the first dust extraction conduct 116 through the inlet 118 and are directed away from the bottom section 204.

In some other examples, the dust extraction conducts or conduct direct a gas flow away from both the area surrounding the top section of the sealing jaws and the bottom section of the internal compartment. This example characteristic allows a more rigorous extraction of leaking particles. As illustrated in the example system of FIG. 4, the first dust extraction conduct 116 has two inlets 118, 119 oriented respectively towards the area 114 surrounding the top section of the sealing jaws and the bottom section 204 of the internal compartment.

In some examples, the system further comprises a second dust extraction conduct facing the first dust extraction conduct. As illustrated in the example systems in FIG. 3A-B, the system comprises a second dust extraction conduct 302 facing the first dust extraction conduct 116, wherein ends 120, 304 of the dust extraction conducts 116, 302 proximal to the bottom seal 108 define a funnel region, wherein the bottom section 204 is nested in the funnel region. In these examples where the ends of the dust extraction conducts define the funnel region, the funnel region allows the dust extraction conduct to collect a high proportion of leaking particles which drop in the direction D towards the funnel region. The second dust extraction conduct 302 shown in FIG. 3A-B also comprises an inlet 306. With such example configuration of the system, at least some leaking particles can be extracted by inlets 118, 306 of both dust extraction conducts 116, 302, allowing the extraction of the at least some leaking particles that leak from two opposite sides of the sheet 102.

While not represented, in some examples, the system comprises more than two dust extraction conducts, the extraction conducts being arranged around the water-soluble dose unit article and above the sealing jaws.

The dust extraction conducts characteristics of the present disclosure should be understood as not limitative to either the first or second dust extraction conduct, they can be applied to both dust extraction conduct or any other additional dust extraction conducts.

In some examples as illustrated in FIG. 4, the system comprises a dosing device formed by a hopper 402 partially arranged into a sleeve 406 of the water-soluble unit dose article 100, the sleeve extending along the direction Y. The hopper 402 illustrated has a generally trapezoidal cross-section, however it may have any suitable cross-section including, square, triangular, circular, oval, hexagonal or a mixture thereof. While not represented, one could consider that the dosing device can be any dosing apparatus, for example, the dosing device can be a standard auger screw device.

As illustrated in the example system of FIG. 4, the hopper 402 defines a plane end 404 which is a surface parallel to plane M and facing the internal compartment 102, wherein the hopper 402 fills the internal compartment with granular laundry detergent particles through the plane end 404. In other words, the plane end 404 corresponds to the exit of the hopper 402. In some examples, a plane N parallel to plane M comprises the plane end 404 and planes N and M are at a distance 406 from each other, the distance 406 corresponds to the distance between the sealing jaws 110, 111 and the hopper 402. This distance should be understood as the chute length of the water-soluble fibrous non-woven sheet.

In some examples, the distance 406 is comprised between 0.5 m and 1.5 m.

In some examples, the distance 406 is comprised between 0.75 m and 1.25 m.

In some examples, the distance 406 is comprised between 0.90 m and 1.10 m.

In some examples, the distance 406 is comprised between 0.95 m and 1.05 m.

As illustrated in the example system of FIG. 5, the bottom seal 108 is comprised in the plane R, and the end 120 of the first extraction conduct 116 proximal to the bottom seal 108 is comprised in a plane T, wherein plane R comprises the direction of the bottom seal and is perpendicular to the top section of the sealing jaws, wherein plane T is parallel to plane R and comprises the end 120. In other words, planes R and T are perpendicular to plane M. Planes T and R are at a distance 502, the distance 502 corresponding to the distance between the end of the extraction conduct proximal to the bottom seal and the bottom seal.

The distance 502 is comprised between 4.5 cm and 12.5 cm.

In some examples, the distance 502 is comprised between 5 cm and 12 cm.

In some examples, the distance 502 is comprised between 6 cm and 11 cm.

In some examples, the distance 502 is comprised between 8 cm and 9 cm.

As illustrated in the example system in FIG. 5, the distance between planes T and R is sufficient enough so that, when the sealing jaws are open, the water-soluble dose unit article can slide through them (i.e. in the direction D).

In some examples as illustrated in FIG. 3B, the system can be asymmetric with respect to the plane R. In the example system of FIG. 3B, the second extraction conduct 302 shown has than the first extraction conduct. In this particular example, the sealing jaw 111 is heated and the second extraction conduct 302 direct the gas flow with a higher flow rate than the first extraction conduct 116, allowing leaking particles and heat produced by the heated sealing jaw to be extracted out of the system by the second extraction conduct 302.

Figure 7:
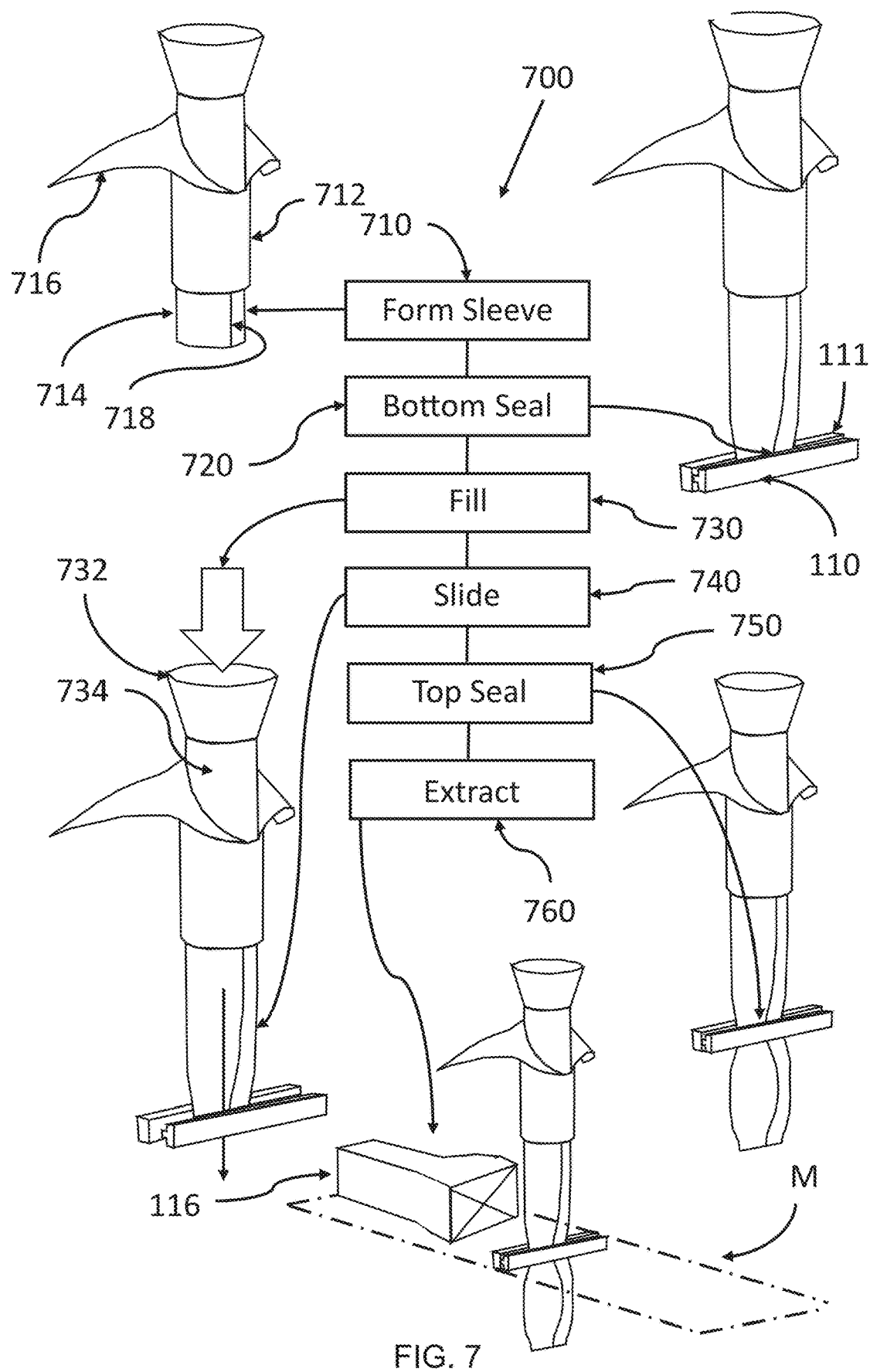
FIG. 7-9 illustrate various example processes.

FIG. 7 illustrates an example process 700 to operate a system according to any of the systems hereby described. The different blocks comprised in the process are associated to a diagram illustrating the corresponding action, diagrams in which the reference numerals are not repeated when referring to similar elements.

In block 710, process 700 comprises forming a sleeve 714 comprising the water-soluble fibrous non-woven sheet. In this example, the sheet is formed from a single sheet 716 which is sealed onto itself to form a longitudinal seal 718 in a sealing device 712 which is not described in detail here. In other examples not represented, the sleeve may be formed from two sheets facing each other and forming the sleeve between two parallel longitudinal sleeves.

In block 720, process 700 comprises transversally sealing the sleeve by maintaining the sealing jaws such as, for example, jaws 110 and 111, closed across the sleeve to form a bottom seal. One should note that by being formed in this manner the bottom seal will have characteristics similar to the top seal. In some examples, the sealing jaws are maintained in contact with the non-woven sheet for more than 50 ms and for less than 600 ms for forming of the seal. In some examples, the sealing jaws are maintained in contact with the non-woven sheet for more than 100 ms and for less than 400 ms for forming of the seal. In some examples, the sealing jaws are maintained in contact with the non-woven sheet for more than 100 ms and for less than 300 ms for forming of the seal. In some examples, the sealing jaws are maintained in contact with the non-woven sheet for more than 230 ms and for less than 280 ms for forming of the seal. Such time ranges permit avoiding damage to the seal (for example due to excessive heat application) while forming a reliable seal (for example through sufficient heat application).

In block 730, process 700 comprises, in response to forming the bottom seal, filling the internal compartment with the granular laundry detergent. Such filling may for example take place by way of a hopper 732 comprising a cylindrical portion or tubular portion 734 around which the sleeve is formed. The filling may also take place in other manners. One should note that such filling leads to the diffusion of fines such as generated by perfume particles, such perfume particles remaining as stragglers in particular in an area which will form the top seal, impacting a melt or fusion of the non-woven sheet forming the seal or weld. In some examples, the process further comprising letting the granular laundry detergent settle in the internal compartment by maintaining the sealing jaws open for at least 50 ms after sliding of the filled internal compartment beyond the open sealing jaws and before forming the top seal.

In block 740, the process 700 comprises opening the sealing jaws and letting the filled internal compartment slide between and beyond the open sealing jaws. One should note that while jaws should be considered closed when they are static and pressed against each other, for example sandwiching the sleeve, jaws should be considered "open" when "not closed", i.e. as being open while opening, while closing, or while remaining open. One should note that the sliding may take place between the jaws by gravity, promoted by the weight of the granular laundry detergent. The distance corresponding to the displacement or travel of the sleeve during the sliding will correspond to a distance between the top and the bottom seal.

In block 750, the process comprises, in response to the sliding of the filled internal compartment beyond the open sealing jaws, transversally sealing the sleeve by maintaining the sealing jaws closed across the sleeve to form the top seal according to this disclosure. In some examples, the sleeve remains static, i.e. does not slide, during the sealing of the top and of the bottom seals.

In block 760, the process 700 comprises extracting, with the first dust extraction apparatus 116, at least a portion of the zeolite particles of the granular laundry detergent away from the bottom section of the internal compartment. In some examples, in block 760, the process 760 comprises extracting at least a portion of the zeolite particles of the granular laundry detergent away from the area surrounding the top section of the sealing jaws. In some examples, in block 760, the process 700 comprises extracting at least a portion of the zeolite particles of the granular laundry detergent away from the area surrounding the top section of the sealing jaws and away from the bottom section of the internal compartment.

In some examples, such extracting comprises directing the gas flow with a gas velocity comprised between 0.2 m/s and 10 m/s.

In some examples, the gas velocity is comprised between 1.5 m/s and 8.5 m/s.

In some examples, the gas velocity is comprised between 2.5 m/s and 7.5 m/s.

In some examples, the gas velocity is comprised between 4 m/s and 6 m/s.

In some examples, such extracting comprises directing the gas flow with a flow rate comprised between 135 m$^3$/h and 460 m$^3$/h.

In some examples, the flow rate is comprised between 175 m$^3$/h and 420 m$^3$/h.

In some examples, the flow rate is comprised between 215 m$^3$/h and 380 m$^3$/h.

In some examples, the flow rate is comprised between 255 m$^3$/h and 345 m$^3$/h.

In some examples, the heated jaw reaches a temperature of more than 180° C. and of less than 250° C. during seal forming. In some examples, the heated jaw reaches a temperature of more than 190° C. and of less than 230° C. during seal forming. In some examples, the heated jaw reaches a temperature of more than 200° C. and of less than 220° C. during seal forming. Temperature ranges have an impact on the time taken to form the seal, and deterioration of the water-soluble fibrous non-woven sheet, or on lifetime of jaw components such as, for example, a non-stick material, non-stick coating or removable layer mentioned above.

In some examples, a process such as process 700 illustrated in FIG. 7 further comprises replacing the removable layer after forming at least 5,000 filled water-soluble unit dose articles. This may be done using systems comprising such removable layer as illustrated for example in FIG. 6. In some examples, the process comprises replacing the removable layer after forming at least 10,000 filled water-soluble unit dose articles. In some examples, the process comprises replacing the removable layer after forming at least 12,000 filled water-soluble unit dose articles. In some examples, the process comprises replacing the removable layer after forming at least 5,000 filled water-soluble unit dose articles in less than 4 hours. In some examples, the process comprises replacing the removable layer after forming at least 10,000 filled water-soluble unit dose articles in less than 4 hours. In some examples, the process comprises replacing the removable layer after forming at least 12,000 filled water-soluble unit dose articles in less than 4 hours.

In some other examples, process 700 further comprises, comprised in block 750 of sealing of the filled water-soluble unit dose article using the jaws to form the top seal, cutting, by the sealing jaws, the top seal along the longitudinal direction of the seal (in other word transversally to the longitudinal direction of the sleeve). Such simultaneous sealing and cutting was found to be particularly efficient.

Figure 8:
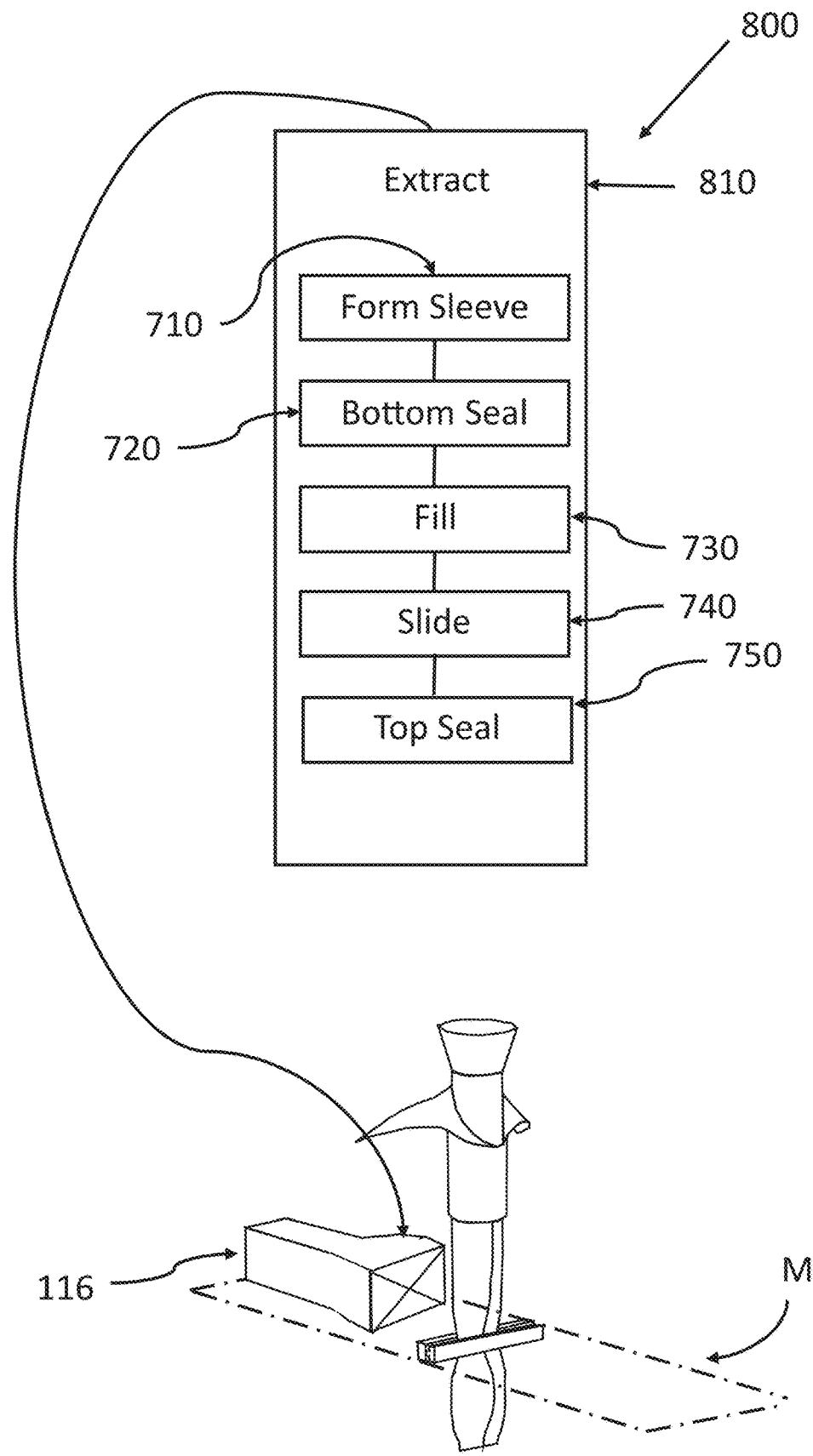

Another example process 800 is illustrated in FIG. 8. Process 800 comprises blocks 710, 720, 730, 740 and 750 as described in the context of process 700, wherein said blocks 710, 720, 730 740 and 750 are comprised in a block 810. In block 810 of the example illustrated in FIG. 8, process 800 comprises extracting continuously during the process 800. In the example process 800 in FIG. 8, such simultaneous extracting 810 and performing either one of blocks 710, 720, 730, 740 and 750 was found to be particularly efficient: at least some of the leaking particles are extracted out of the system before they damage the sealing jaws.

In some other examples, block 760 is performed cyclically during a time interval, the time interval being comprised between 0.6 seconds and 1.5 seconds.

In some examples, the extracting time interval is comprised between 0.75 seconds and 1.25 seconds.

In some examples, the extracting time interval is comprised between 0.90 seconds and 1.10 seconds.

In some examples, the extracting time interval is comprised between 0.95 seconds and 1.05 seconds.

In some examples, such cyclic extracting was found to be particularly energy saving while ensuring a satisfactory extraction of the particles.

Figure 9:
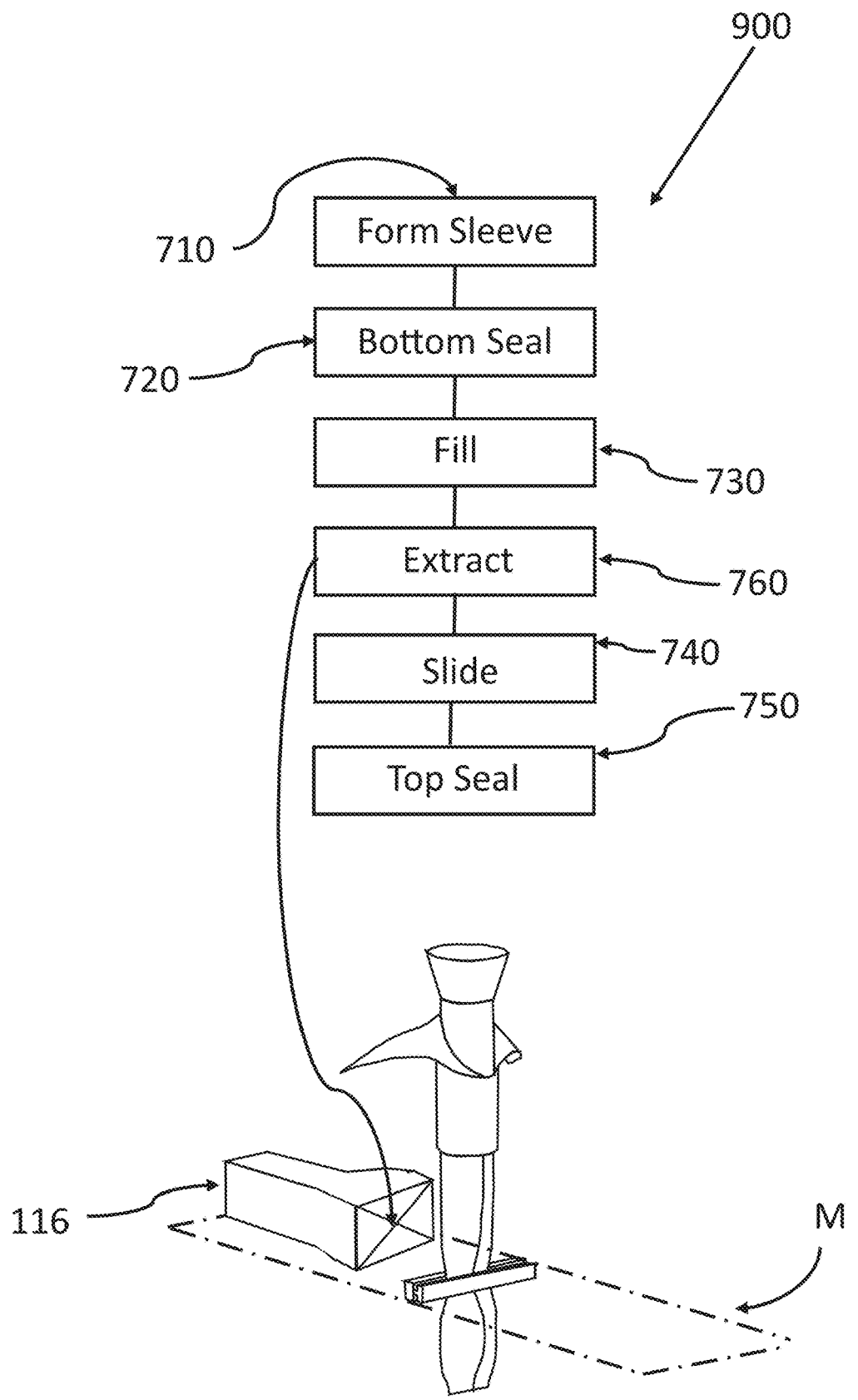

Another example process 900 illustrated in FIG. 9 comprises blocks 710, 720, 730, 740, 750 and 760 as described in the context of process 700 in FIG. 7, wherein block 760 is performed after block 730 and before block 740. In the example process 900, such sequencing of the filling the internal compartment with the granular laundry detergent followed by extracting with the dust extraction conduct was found to be particularly efficient: the particles of granular laundry detergent are more likely to leak after the filling because of the force they apply on the water-soluble fibrous non-woven sheet when they fall and accumulate at the bottom of the internal compartment. In other words, the extracting is performed after filling the internal compartment with the granular laundry detergent.

While not represented, in some examples, block 760 is performed after block 740 and before block 750.

While not represented, in some examples, the dust extraction conducts are mobile, for example the dust extraction can rotate around the water-soluble unit dose article (i.e. around the direction of the sleeve). In some examples, a process further comprises rotating the dust extraction conducts around the water-soluble unit dose article prior to extracting, the rotation being of an angle comprised between 360°/N, N being the number of dust extraction conducts of the system.

In some examples, the rotation is of an angle comprised between 1° and 360°.

In some examples, the rotation is of an angle comprised between 45° and 325°.

In some examples, the rotation is of an angle comprised between 90° and 270°.

In some examples, the rotation is of an angle comprised between 135° and 225°.

In some examples, the rotating is performed simultaneously during the extracting.

In some examples, the rotation is performed cyclically during a time interval comprised between 0.6 seconds and 1.5 seconds.

In some examples, the rotation time interval is comprised between 0.75 seconds and 1.25 seconds.

In some examples, the rotation time interval is comprised between 0.90 seconds and 1.10 seconds.

In some examples, the rotation time interval is comprised between 0.95 seconds and 1.05 seconds.

In some examples, the dust extraction conducts are mobile along the direction X, allowing the distance between the dust extraction conduct and the bottom seal (i.e. the distance between planes T and R in FIG. 5) to be regulated. In some examples, a process further comprises moving the dust extraction conducts proximal to the bottom seal prior to extracting, and moving the dust extraction conducts away from the bottom seal following the extracting. In some examples, a process further comprises moving the dust extraction conducts proximal to the bottom seal so that their ends proximal to the bottom seal define the funnel region.

The characteristics of the dust extraction conducts described in this disclosure can be applied to the dust extraction conduct performing the extracting during the process.

One should note that different ranges are provided in this description for different dimensions such as temperature, time, lengths or quantities of articles produced, for example. The combining of such ranges, in particular the combining of different narrow ranges, was found to lead to progressively increase the reliability of the articles, and the effectivity of the manufacture of such articles.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system comprising:
    a water-soluble unit dose article comprising a water-soluble fibrous non-woven sheet and a granular laundry detergent, wherein the water-soluble fibrous non-woven sheet is shaped to form a partially sealed internal compartment, wherein the water-soluble fibrous non-woven sheet has an air permeability comprised between about 5 $m^3/m^2$/min and about 200 $m^3/m^2$/min, wherein the granular laundry detergent is comprised within said internal compartment, wherein the water-soluble fibrous non-woven sheet comprises a plurality of fibres, wherein the fibres comprise polyvinyl alcohol polymer, and wherein the granular laundry detergent comprises a plurality of particles, wherein the plurality of particles comprises zeolite particles;
    sealing jaws, wherein at least one of the sealing jaws is a heated sealing jaw, wherein a bottom seal of the internal compartment is sandwiched between the jaws, wherein the jaws comprise a non-stick coating in contact with the bottom seal; and
    a first dust extraction conduct to direct a gas flow away from an area surrounding a top section of the sealing jaws and away from a bottom section of the internal compartment.

2. The system according to claim 1 further comprising a second dust extraction conduct facing the first dust extraction conduct, wherein ends of the dust extraction conducts proximal to the bottom seal define a funnel region, wherein the bottom section is nested in the funnel region.

3. The system according to claim 1, wherein the non-stick coating comprises a polymeric material.

4. The system according to claim 1, wherein the water-soluble fibrous non-woven sheet has a chute length comprised between about 0.5 m and about 1.5 m, the length being measured between the sealing jaws and a dosing device.

5. The system according to claim 1, wherein the plurality of particles comprises between about 0.1 wt % and about 5.0 wt % of zeolite particles.

6. The system according to claim 1, wherein the plurality of particles further comprises sodium carbonate particles.

7. The system according to claim 1, wherein the plurality of particles further comprises starch encapsulated accord particles.

8. The system according to claim 1, wherein the end of the extraction conduct proximal to the bottom seal is at a distance of the bottom seal comprised between about 4.5 cm and about 12.5 cm.

9. A process to operate the system according to claim 1 comprising:
    forming a sleeve comprising the water-soluble fibrous non-woven sheet;
    transversally sealing the sleeve by maintaining the sealing jaws closed across the sleeve to form the bottom seal;
    in response to forming the bottom seal, filling the internal compartment with the granular laundry detergent;
    opening the sealing jaws and letting the filled internal compartment slide between and beyond the open sealing jaws;
    in response to the sliding of the filled internal compartment beyond the open sealing jaws,
    transversally sealing the sleeve by maintaining the sealing jaws closed across the sleeve to form a top seal; and
    extracting, with a dust extraction apparatus, at least a portion of the zeolite particles of the granular laundry detergent away from at least one of the area surrounding the top section of the sealing jaws and the bottom section of the internal compartment.

10. The process according to claim 9, wherein the extracting comprises directing the gas flow with a gas velocity comprised between about 0.2 m/s and about 10 m/s.

11. The process according to claim 9, wherein the extracting comprises directing the gas flow with a flow rate comprised between about 50 mm and about 200 mm.

12. The process according to claim 9, wherein extracting is performed continuously during the process.

13. The process according to claim 9, wherein extracting is performed during a time interval, the time interval being comprised between about 0.6 seconds and about 1.5 seconds.

14. The process according to claim 13, wherein extracting is performed after filling the internal compartment with the granular laundry detergent.

* * * * *